(12) United States Patent
Davda et al.

(10) Patent No.: US 10,061,724 B2
(45) Date of Patent: Aug. 28, 2018

(54) LATENCY REDUCTION FOR DIRECT MEMORY ACCESS OPERATIONS INVOLVING ADDRESS TRANSLATION

(71) Applicant: VMware, Inc., Palo Alto, CA (US)

(72) Inventors: Bhavesh Davda, Fremont, CA (US); Benjamin C. Serebrin, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 143 days.

(21) Appl. No.: 15/284,413

(22) Filed: Oct. 3, 2016

(65) Prior Publication Data
US 2017/0024341 A1    Jan. 26, 2017

Related U.S. Application Data

(63) Continuation of application No. 13/906,004, filed on May 30, 2013, now Pat. No. 9,460,024.
(60) Provisional application No. 61/788,453, filed on Mar. 15, 2013.

(51) Int. Cl.
| | |
|---|---|
| *G06F 12/0862* | (2016.01) |
| *G06F 13/28* | (2006.01) |
| *G06F 12/1081* | (2016.01) |
| *G06F 12/1027* | (2016.01) |
| *G06F 12/14* | (2006.01) |
| *G06F 9/455* | (2018.01) |

(52) U.S. Cl.
CPC .......... *G06F 13/28* (2013.01); *G06F 12/0862* (2013.01); *G06F 12/1027* (2013.01); *G06F 12/1081* (2013.01); *G06F 12/145* (2013.01); *G06F 9/45533* (2013.01); *G06F 2212/1024* (2013.01); *G06F 2212/151* (2013.01); *G06F 2212/602* (2013.01); *G06F 2212/654* (2013.01)

(58) Field of Classification Search
CPC ............ G06F 12/0862; G06F 12/1081; G06F 12/1027; G06F 12/145; G06F 13/28; G06F 2212/602; G06F 2212/654
See application file for complete search history.

(56) References Cited

U.S. PATENT DOCUMENTS

| | | | | |
|---|---|---|---|---|
| 2010/0070677 A1* | 3/2010 | Thakkar | ................... | G06F 13/28 711/6 |
| 2014/0201305 A1* | 7/2014 | Dalal | ...................... | G06F 13/16 709/212 |

* cited by examiner

*Primary Examiner* — Ernest Unelus
(74) *Attorney, Agent, or Firm* — Patterson + Sheridan, LLP

(57) ABSTRACT

Latency reduction for direct memory access operations involving address translation is disclosed. Example methods disclosed herein to perform direct memory access (DMA) operations include initializing a ring of descriptors, the descriptors to index respective buffers for storing received data in a first memory. Such example methods also include causing prefetching of a first address translation associated with a second descriptor in the ring of descriptors to be performed after a first DMA operation is performed to store first received data in a first buffer indexed by a first descriptor in the ring of descriptors and before second received data to be stored in the first memory is received, the first address translation being associated with a second DMA operation for storing the second received data in the first memory.

20 Claims, 11 Drawing Sheets

US 10,061,724 B2

LATENCY REDUCTION FOR DIRECT MEMORY ACCESS OPERATIONS INVOLVING ADDRESS TRANSLATION

RELATED APPLICATION(S)

This application is a continuation of U.S. patent application Ser. No. 13/906,004, filed May 30, 2013 entitled "LATENCY REDUCTION FOR DIRECT MEMORY ACCESS OPERATIONS INVOLVING ADDRESS TRANSLATION", which claims the benefit of priority of U.S. Provisional Application Ser. No. 61/788,453, entitled "LATENCY REDUCTION FOR DIRECT MEMORY ACCESS OPERATIONS INVOLVING ADDRESS TRANSLATION" filed Mar. 15, 2013, all of which are incorporated by reference in its entirety.

FIELD OF THE DISCLOSURE

This disclosure relates generally to direct memory access processing and, more particularly, to latency reduction for direct memory access operations involving address translation.

BACKGROUND

Virtualization allows a host processing platform to support multiple virtual machines by abstracting the physical (e.g., hardware) platform to enable each virtual machine to operate independently from the other virtual machines executing on the processing platform. In a virtual processing environment, a hypervisor, also referred to as a virtual machine monitor (VMM), abstracts the host's physical (e.g., hardware) platform and presents an abstracted, or virtual, processing platform to each of the virtual machines. To enable independent operation of the virtual machines, such abstraction includes mapping one or more address regions in the host's physical memory to a virtual memory address space, also referred to herein as a guest physical memory address space, accessible by a guest operating system (OS) executed by a particular virtual machine. At least some virtual processing environments employ an input/output memory management unit (IOMMU) to facilitate direct memory access (DMA) operations between one or more I/O devices and the virtual memory address space that is accessible by a particular virtual machine. Such IOMMUs can provide automatic address translation between the guest physical memory addresses (e.g., virtual addresses) associated with a particular virtual machine and the actual host physical addresses (e.g., machine-level addresses, also referred to as system physical addresses) of the system memory, thereby enabling the use of DMA operations for transferring data between an I/O device and the virtual memory address space accessible by the virtual machine.

BRIEF DESCRIPTION OF THE DRAWINGS

Wherever possible, the same reference numbers will be used throughout the drawing(s) and accompanying written description to refer to the same or like parts, elements, etc.

DETAILED DESCRIPTION

Figure 1:
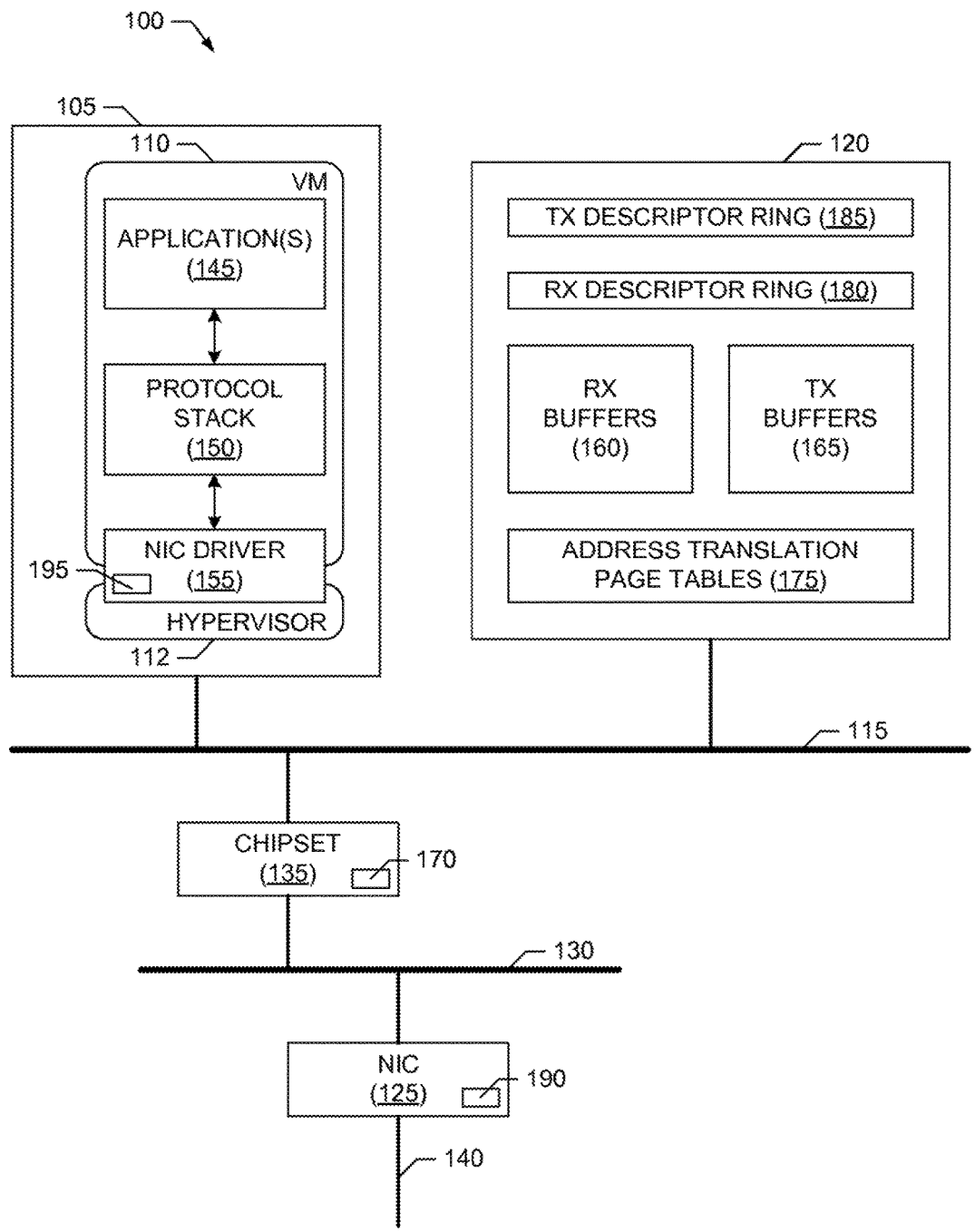
FIG. 1 is a block diagram of an example virtual processing environment implementing direct memory access (DMA) operations with address translation as disclosed herein.

Methods, apparatus and articles of manufacture (e.g., machine readable storage media) to perform direct memory access (DMA) operations involving address translation are disclosed herein. Some disclosed example methods to perform such DMA operations include initializing a ring of descriptors in which the descriptors are to index respective buffers for storing received data in a first memory. Such example methods also include causing prefetching of an address translation to be performed after a first DMA operation is performed to store first received data in a first buffer in the first memory and before second received data to be stored in the first memory is received. In such examples, the address translation is associated with a second DMA operation for storing the second received data in the first memory. For example, prefetching of the address translation can be caused by causing an input/output memory management unit (IOMMU) to prefetch the address translation and cache the address translation in an input/output translation lookaside buffer (IOTLB) before the second received data is to be received and the second DMA operation is to be performed.

In some examples, the first buffer is indexed by a first descriptor in the ring of descriptors and the second received data is to be stored in a second buffer indexed by a second descriptor that is a next descriptor in the ring of descriptors relative to the first descriptor. In such examples, some disclosed example methods can cause prefetching of the address translation to be performed by initiating a third DMA operation to retrieve the second descriptor from the ring of descriptors. In such examples, the third DMA operation is to cause a first address translation for translating a guest physical address of the second descriptor to a host physical address of the second descriptor to be prefetched and cached before the second received data is to be received and the second DMA operation is to be performed. Furthermore, in some such example methods, a fourth DMA operation is initiated to access the second buffer indexed by the second descriptor to cause a second address translation for translating a guest physical address of the second buffer to a host physical address of the second buffer to be prefetched and cached before the second received data is to be received and the second DMA operation is to be performed. For example, the third DMA operation can be a DMA read operation initiated by a network interface card (NIC) to read the next descriptor (which is the second descriptor) from the ring of descriptors (e.g., without post-incrementing a pointer tracking the active descriptor to be used by the NIC), and the fourth DMA operation can be a DMA write operation initiated by the NIC to perform a null write to the second buffer. In some such examples, success of the DMA write operation is not to be signaled by the NIC to a NIC driver controlling the NIC (e.g., because the DMA write operation is for a null write to the second buffer and not for storing any received data to the second buffer).

Additionally or alternatively, some disclosed example methods can cause prefetching of the address translation to be performed by issuing a first transmit command having a transmit buffer address set to a guest physical address of the second descriptor. In such examples, the first transmit command is to cause the NIC to initiate the third DMA operation to access the second descriptor. As in the preceding examples, the third DMA operation is to cause the first address translation for translating the guest physical address of the second descriptor to the host physical address of the second descriptor to be prefetched and cached before the second received data is to be received and the second DMA operation is to be performed. However, in the present examples, the third DMA operation corresponds to, for example, a DMA read operation initiated by the NIC to read the transmit buffer address specified in the first transmit command, which corresponds to the guest physical address of the second descriptor. Furthermore, in some such example methods, the methods further initiate a second transmit command having a transmit buffer address set to a guest physical address of the second buffer. In such examples, the second transmit command is to cause the NIC to initiate the fourth DMA operation to access the second buffer. As in the preceding examples, the fourth DMA operation is to cause the second address translation for translating the guest physical address of the second buffer to the host physical address of the second buffer to be prefetched and cached before the second received data is to be received and the second DMA operation is to be performed. However, in the present examples, the fourth DMA operation corresponds to, for example, a DMA read operation initiated by the NIC to read the data from the transmit buffer address specified in the second transmit command, which corresponds to the guest physical address of the second buffer. In some examples, the first and second transmit commands specify that their respective transmit buffer addresses are to be read but the data contained in the buffers is not to be transmitted (e.g., by setting a flag in the transmit command, by specifying an invalid data length for data stored in the buffer, etc.).

Other disclosed example methods to perform DMA operations involving address translation include initializing a ring of descriptors in which the descriptors are to index respective buffers for storing, in a first memory, data to be transmitted. Such example methods also include causing prefetching of an address translation to be performed after a first DMA operation is performed to retrieve, for transmission, first data from a first buffer in the first memory and before second data is determined to be ready for transmission. In such examples, the address translation is associated with a second DMA operation for retrieving the second data from the first memory. For example, prefetching of the address translation can be caused by causing an input/output memory management unit (IOMMU) to prefetch the address translation and cache the address translation in an input/output translation lookaside buffer (IOTLB) before the second received data is determined to be ready for transmission and before the second DMA operation is to be performed.

In some such examples, the first buffer is indexed by a first descriptor in the ring of descriptors, and the second data is to be stored in a second buffer indexed by a second descriptor that is a next descriptor in the ring of descriptors relative to the first descriptor. In some such examples, the methods cause prefetching of the address translation to be performed by initiating a third DMA operation to retrieve the second descriptor from the ring of descriptors. In such examples, the third DMA operation is to cause a first address translation for translating a guest physical address of the second descriptor to a host physical address of the second descriptor to be prefetched and cached before the second data is determined to be ready for transmission and before the second DMA operation is to be performed. Furthermore, in some such example methods, a fourth DMA operation is initiated to access the second buffer indexed by the second descriptor to cause a second address translation for translating a guest physical address of the second buffer to a host physical address of the second buffer to be prefetched and cached before the second data is determined to be ready for transmission and before the second DMA operation is to be performed. For example, the third DMA operation can be a DMA read operation initiated by a NIC to read the second descriptor from the ring of descriptors, and the fourth DMA operation can a DMA read operation initiated by the NIC to perform a read from the second buffer. In some examples, the NIC is to not transmit the data read from the second buffer using the DMA read operation (e.g., because the DMA read operation corresponds to a dummy read to prefetch the address translation and the data that is read is not valid data to transmit).

Additionally or alternatively, in some such examples, the second buffer is allocated for use by a NIC driver controlling the NIC, and the example methods further include initializing the second descriptor to index the second buffer, copying the second data from a third buffer associated with an application to the second buffer when the application signals to the NIC driver that the second data is ready to be transmitted, and issuing a transmit command to cause the NIC to transmit the second data stored in the second buffer. In such examples, the address translations for the second buffer can be prefetched because the second buffer is allocated to the NIC driver and at a known location in memory, rather than being allocated to the application and at an unknown (e.g., random) location in memory.

Yet other disclosed example methods to perform DMA operations involving address translation include reserving buffers in memory for use by a NIC driver controlling a NIC, and initializing a ring of descriptors in which the descriptors are to index respective ones of the buffers reserved for use by the NIC driver. Such example methods also include exposing an interface for an application to request a first one of the buffers for storing data for transmission. Such example methods further include allocating the first one of the buffers to the application in response to receiving a request from the application via the interface. In at least some examples, the buffers are located in a region of memory covered by a first number of page tables less than a total number of page tables used by an IOMMU to perform address translation. In this way, the IOMMU can perform address translations for the buffers allocated to the NIC driver by walking fewer than the total number of page tables used by the IOMMU.

These and other example methods, apparatus, systems and articles of manufacture (e.g., physical storage media) to perform DMA operations involving address translation are disclosed in greater detail below.

As noted above, an IOMMU can implement address translation to support DMA operations for storing data from an I/O device to memory accessible by a particular virtual machine, and/or reading data from the memory accessible by the particular virtual machine to the I/O device. Such address translation maps a guest physical memory address associated with a particular virtual machine to an actual host physical addresses in the system memory. While such address translations enable virtual machines to be allocated their own unique guest physical address spaces in memory, such address translations can also increase the latency associated with DMA operations performed to write data to and/or read data from a virtual memory space associated with a particular virtual machine.

For example, a virtual processing environment can employ an IOMMU to perform DMA write operations to store data received by a NIC to a memory location (e.g., buffer) associated with a particular virtual machine. The IOMMU in such an example can also be employed to perform DMA read operations to retrieve data from a memory location (e.g., buffer) associated with a particular virtual machine and to provide the data to the NIC for transmission. Such DMA write and read operations can involve performing address translations to map guest physical memory addresses, which are used by the virtual machine to represent the locations of the data buffers in memory, to the actual host physical addresses of these buffers in memory. Furthermore, some virtual processing environments may use rings (or queues) of descriptors to index the buffers in memory. In such examples, the IOMMU may be used to perform DMA read operations to retrieve the descriptors from memory, which may involve performing a second address translation in addition to the address translation associated with accessing the buffer indexed by a particular descriptor. The latency associated with such address translations can reduce the speed at which the IOMMU can perform DMA operations and, thus, may reduce the data throughput of the virtual processing environment.

Disclosed example methods, apparatus, systems and articles of manufacture (e.g., physical storage media) implement techniques capable of reducing the latency associated with DMA operations involving address translation. For example, some such disclosed techniques perform address translation prefetching in which address translations associated with a DMA operation are caused to be prefetched (e.g., by an IOMMU) and cached (e.g., in an IOTLB used by the IOMMU) before a DMA operation that is to rely on the address translation is to be performed. In this way, the address translation is available and cached for use by the IOMMU when the DMA operation is performed, thereby avoiding a cache miss and the resulting page walk that would be performed by the IOMMU to determine the address translation. Other disclosed techniques additionally or alternatively include allocating the buffers to which data is to be stored and/or from which data is to be read in known (e.g., contiguous) regions of memory. In this way, the address translations for such buffers can be prefetched with higher accuracy than when the buffers are located randomly in memory (e.g., according to a scatter-gather implementation). Such buffer allocation can also decrease the number of page tables the IOMMU has to walk before determining an address translation for a particular memory location.

Turning to the figures, a block diagram of an example virtual processing environment 100 capable of implementing DMA operations involving address translation as disclosed herein is illustrated in FIG. 1. The virtual processing environment 100 of the illustrated example includes an example host processor 105 capable of supporting one or more virtual machines, such as the example virtual machine 110. As such, the host processor 105 executes an example hypervisor 112 to abstract the physical (e.g., hardware) platform of the virtual processing environment 100, which includes the physical resources of the host processor 105 (e.g., such as the host's internal memory, registers, functions, etc.), and also the external physical resources connected to or otherwise in communication with the host processor 105 via an example system bus 115. For example, the example virtual processing environment 100 of FIG. 1 includes example memory 120 (e.g., system memory) that is in communication with the host processor 105 via the system bus 115, and an example NIC 125 that is in communication with the host processor 105 via the system bus 115, an example external interface bus 130, and an example chipset 135. The hypervisor 112 is able to abstract the interfaces to the memory 120 and the NIC 125 such that the virtual machine 110 can access these resources independently from other virtual machines executing on the host processor 105.

In the illustrated example of FIG. 1, the host processor 105 can be implemented by any number and/or type(s) of processors, processing elements/nodes, etc., such as the processor 1012 included in the example processor platform 1000 of FIG. 10, which is described in greater detail below. The system bus 115 of the illustrated example can be implemented by any number and/or type(s) of busses, switching meshes/fabrics, interface circuits, etc., such as a front-side bus (FSB), a HyperTransport bus, the bus 1018 included in the example processor platform 1000 of FIG. 10, which is described in greater detail below, etc. The memory 120 of the illustrated example can be implemented by any number and/or type(s) of memory elements, storage elements, etc., such as one or more of the example memories 1013, 1014 and/or 1016 included in the example processor platform 1000 of FIG. 10, which is described in greater detail below. The external interface bus 130 of the illustrated example can be implemented by any number and/or type(s) of busses, switching meshes/fabrics, interface circuits, etc., such as a peripheral component interconnect (PCI) bus, etc. The chipset 135 of the illustrated example can be implemented by, for example, a bus bridge, such as a PCI bridge, and/or any other logic, circuitry, etc., for interconnecting the system bus 115 and the external interface bus 130.

In the illustrated example, the NIC 125 can be any type of NIC capable of receiving data from and transmitting data on an example communication medium 140, which may correspond to a communication network, a transmission line, a communication bus, a data port, etc. As such, the NIC 125 of the illustrated example can include an example medium access unit (not shown) to access the communication medium 140 and process data received via the communication medium 140 and/or to be transmitted on the communication medium 140. Additionally, the NIC 125 of the illustrated example can include local memory (not shown) to store data locally after reception and/or prior to transmission. In some examples, the example NIC 125 of FIG. 1 can be implemented by the interface circuit 1020 included in the example processor platform 1000 of FIG. 10, which is described in greater detail below.

In the illustrated example of FIG. 0.1, the virtual machine 110 implements a guest OS (not shown) upon which one of more example applications 145 can be executed. The guest OS of the virtual machine 110 also provides an example protocol stack 150 to enable data to be transmitted by the application(s) 145 to a destination location, and/or received by the application(s) 145 from a source location. The protocol stack 150 of the illustrated example can be implemented by any number and/or type(s) of protocol stacks, such as a transmission control protocol/Internet protocol (TCP/IP) protocol stack, etc. The application(s) 145 can include any number and/or type(s) of applications capable of transmitting and/or receiving data.

In the example virtual processing environment 100 of FIG. 1, the guest OS of the virtual machine 110 also provides an example NIC driver 155 to configure and manage operation of the NIC 125. In particular, the NIC driver 155 of the illustrated example configures and controls operation of the NIC 125 on behalf of the application(s) 145 being executed in the virtual machine 110. For example, the NIC driver 155 configures the NIC 125 to receive, from the communication medium 140, data destined for an application 145 executing on the virtual machine 110 and to store the received data in the memory 120 for retrieval by the application 145. Additionally or alternatively, the NIC driver 155 configures the NIC 125 to retrieve, from the memory 120, data generated by an application 145 executing on the virtual machine 110 and to be transmitted to a destination via the communication medium 140.

To enable the virtual machine 110 to operate independently of other virtual machines in the virtual processing environment 100, the hypervisor 112 executing on the host processor 105 performs, among other things, memory address abstraction to map virtual (also referred to as guest) memory addresses used by the virtual machine 110 to access locations in the memory 120 to the actual machine (also referred to as physical) memory addresses for these locations in the memory 120. For example, the hypervisor 112 may map guest physical memory addresses in a first range (e.g., the range of 0x0 to 0x1000 or some other range) for the virtual machine 110 to actual host physical addresses in a second range (e.g., a range of 0x6000 to 0x7000 or some other range) in the memory 120 (where 0x indicates that a number is written in hexadecimal format). In some examples, the hypervisor 112 may also map, for a second virtual machine (not shown), guest physical memory addresses in the same first range, or a different range, to a range in the memory 120 that is different than the second range, which yields memory isolation between the virtual machine 110 and the second virtual machine.

In the illustrated example of FIG. 1, example transmit buffers 165 correspond to guest physical memory of the VM 110 allocated by one or more of the application(s) 145, the protocol stack 150 and/or the NIC driver 155 for storing data for transmission. Furthermore, in the illustrated example, the NIC driver 155 places the guest physical addresses corresponding to the transmit buffers 165 in an example descriptor ring 185, which the hypervisor 112 uses to map the transmit buffers 165 to host physical (or machine) addresses. The descriptor ring 185 is described in greater detail below. In some examples, such as examples in which zero copy transmit is supported, the same transmit buffers 165 are also used to transmit the data (e.g., in the form of data packets) over the physical NIC 125. In the illustrated example of FIG. 1, the hypervisor 112 and the guest OS in the VM 110 also allocate example receive buffers 160 in the memory 120. For example, the hypervisor 112 can allocate receive buffers 160 into which the physical NIC 125 is to store received data (e.g., packets), whereas the guest OS in the VM 110 can allocate receive buffers 160 for use by the hypervisor 112 to map and copy the data (e.g., packets) received and stored by the physical NIC 125 (e.g., for use by one or more of the application(s) 145, the protocol stack 150 and/or the NIC driver 155). The receive buffers 160 may be located in one or more contiguous regions in memory 120, and/or located randomly in the memory 120. Likewise, the transmit buffers 165 may be located in one or more contiguous regions in memory 120, and/or located randomly in the memory 120.

To support DMA operations to write data received by the NIC 125 to the receive buffers 160, and to read data from the transmit buffers 165 to the NIC 125 for transmission, the example virtual processing environment 100 of FIG. 1 also includes an example IOMMU 170 in the example chipset 135, example address translation page tables 175 stored in the memory 120, and example receive and transmit descriptor rings 180 and 185, respectively, stored in the memory 120. In the illustrated example of FIG. 1, the hypervisor 112 allocates the receive descriptor ring 180 (also referred to as a receive descriptor queue 180) and the transmit descriptor ring 185 (also referred to as a transmit descriptor queue 185) for the virtual machine 110. The receive descriptor ring 180 includes a set of receive descriptors, arranged sequentially in memory, and in which each receive descriptor can be configured (e.g., by the NIC driver 155) to index a particular receive buffer 160 in the set of receive buffers. The receive descriptor ring 180 also includes at least two pointers, referred to herein as a producer pointer and a consumer pointer, to be used to select the active descriptors in the receive descriptor ring 180 that are indexing the receive buffers 160 to which received data is to be written by the NIC 125, and from which received data is to be retrieved by the application(s) executing in the virtual machine 110. Similarly, the transmit descriptor ring 185 includes a set of transmit descriptors, arranged sequentially in memory, and in which each transmit descriptor can be configured (e.g., by the NIC driver 155) to index a particular transmit buffer 165 in the set of transmit buffers. Like the receive descriptor ring 180, the transmit descriptor ring 185 also includes at least two pointers, referred to herein as a producer pointer and a consumer pointer, to be used to select the active descriptors in the transmit descriptor ring 185 that are indexing the transmit buffers 165 to which data to be transmitted is to be written by the application(s) executing in the virtual machine 110, and from which this data is to be retrieved by the NIC 125 for transmission via the communication medium 140.

In the illustrated example virtual processing environment 100 of FIG. 1, the descriptors in the receive descriptor ring 180 and the transmit descriptor ring 185 are configured by the NIC driver 155 with the guest physical memory addresses of the respective receive buffers 160 and transmit buffers 165 to be indexed by the descriptors. In the illustrated example, the NIC driver 155 also initializes the NIC 125 with the guest physical memory addresses of the respective receive descriptor ring 180 and the transmit descriptor ring 185 to enable the NIC 125 to access these rings in memory. The chipset 135 of the illustrated example includes the example IOMMU 170 to, among other things, translate these guest physical memory addresses to their respective host physical memory addresses to allow the actual locations of the receive descriptor ring 180 and the transmit descriptor ring 185, as well as the receive buffers 160 and transmit buffers 165, to be accessed in memory using DMA operations. To support such address translation, the example IOMMU 170 utilizes the set of address translation page tables 175 stored in memory and walks the address translation page tables 175 using any appropriate page walking and address translation technique to translate the guest physical memory addresses associated with the virtual machine 110 to the respective host physical addresses in the memory 120.

Figure 12:
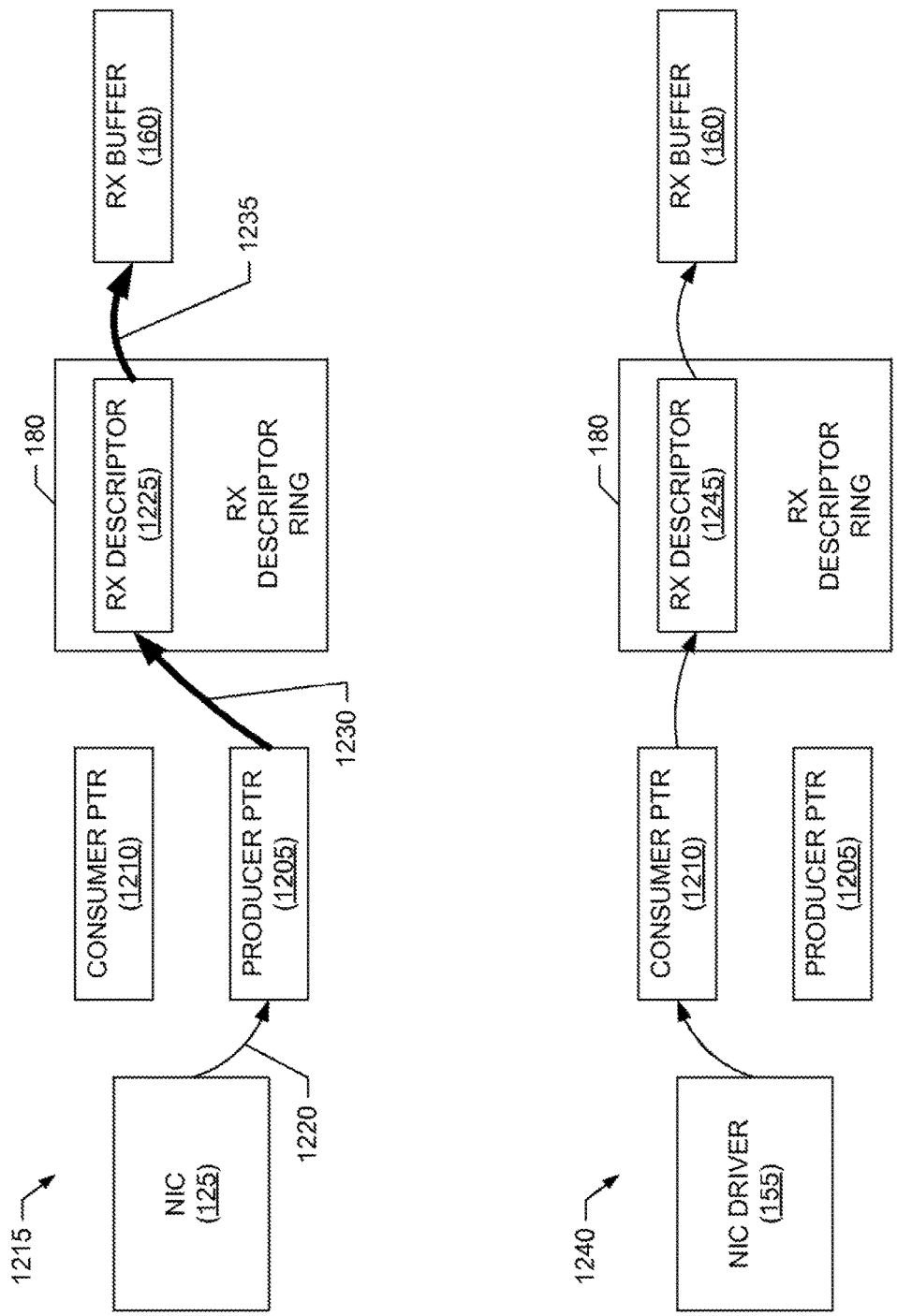
FIGS. 12 and 13 illustrate example DMA operations involving address translation that may be performed in the example virtual processing environment of FIG. 1.
Figure 13:
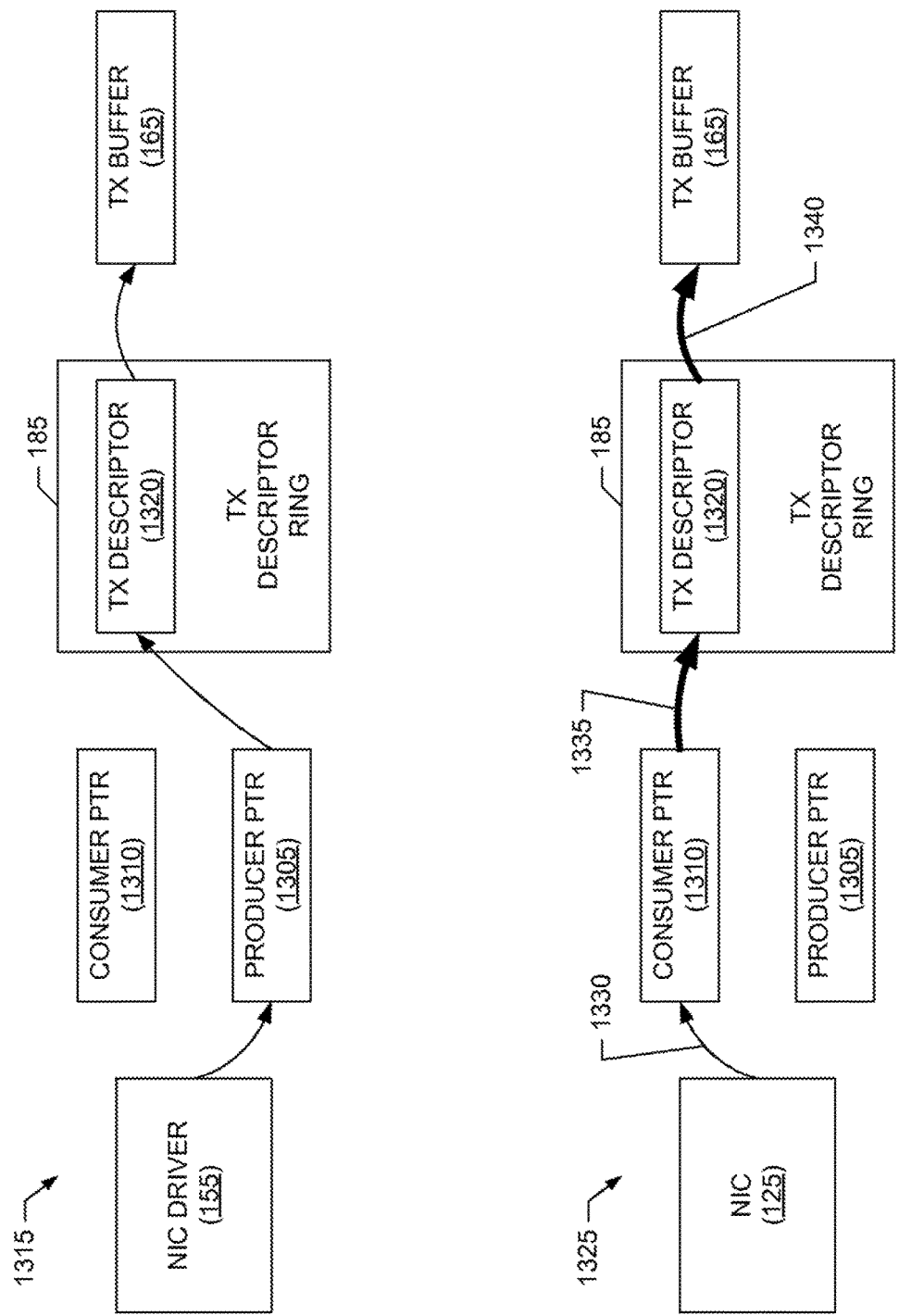

Example sequences of operations further demonstrating the use of address translation when performing DMA operations in the example virtual processing environment 100 of FIG. 1 are illustrated in FIGS. 12 and 13. Prior to the example operations of the virtual processing environment 100 illustrated in these figures, the NIC driver 155 has initialized the NIC 125 with the starting guest physical addresses of the receive descriptor ring 180 and the transmit descriptor ring 185, as well as the lengths of each ring. Example producer and consumer pointers 1205, 1210 of the receive descriptor ring 180, and example producer and consumer pointers 1305, 1310 of the transmit descriptor ring 185 are also initialized by the NIC driver 155 to point to the start of the respective rings 180 and 185. Then, referring to the example sequence of operations 1215 of FIG. 12, when received data, such as a received data packet, is received by the NIC 125, the NIC 125 initiates a DMA read operation (represented by the directed arrow 1220) to read the current receive descriptor 1225 that is at the location in the receive descriptor ring 180 pointed to by the ring's producer pointer 1205. The DMA operation initiated 1220 by the NIC 125 is processed by the IOMMU 170 in the chipset 135, which performs an address translation (represented by the directed arrow 1230) to map the guest physical address referenced by the receive descriptor ring's producer pointer 1205 to the actual host physical address of this receive descriptor 1225 in the receive descriptor ring 180. The IOMMU 170 then performs the DMA read operation to retrieve and provide the contents of this receive descriptor to the NIC 125.

Next, the NIC 125 obtains the receive buffer address, which is a guest physical address configured by the NIC driver 155 during initialization or during run-time operation, from the retrieved receive descriptor 1225 and initiates a DMA write operation to write the received data to this receive buffer 160. Again, this DMA operation is processed by the IOMMU 170, which performs another address translation (represented by the directed arrow 1235) to map the guest physical address of the receive buffer 160 to the actual host physical address of the receive buffer 160 in the memory 120. The IOMMU 170 then performs the DMA write operation to write and store the received data (e.g., the received data packet) to the receive buffer 160.

Meanwhile, the NIC 125 also post-increments the receive descriptor ring's producer pointer 1205 to point to the next receive descriptor in the receive descriptor ring 180. In parallel with the storage of the receive data to the receive buffers 160, and referring to the example sequence of operations 1240 of FIG. 12, the NIC driver 155 uses the receive descriptor ring's consumer pointer 1210 to access the next descriptor in the receive descriptor ring 180. At some later time, the descriptor ring's consumer pointer 1210 will have been incremented to point to the receive descriptor 1225. At that time, the NIC driver 155 can use the receive descriptor ring's consumer pointer 1210 to access the receive descriptor 1225 and then use the contents of the receive descriptor 1225 to read the data previously stored in the receive buffer 160 by the NIC 125. The NIC driver then post-increments the receive descriptor ring's consumer pointer 1210 to point to the next receive descriptor in the receive descriptor ring 180. As described in further detail below, the example techniques disclosed herein can reduce the DMA operation latency associated the address translations 1230 and/or 1235.

Referring to the example sequence of operations 1315 of FIG. 13, for the transmit data case, when an application 145 is ready to transmit data, the application 145 calls the NIC driver 155 with the guest physical address of the transmit buffer 165 in which the data to be transmitted is stored. The NIC driver 155 then configures the current available transmit descriptor 1320 pointed to by the transmit descriptor ring's producer pointer 1305 with the guest physical address of this transmit buffer 165. The NIC driver 155 then post-increments the transmit descriptor ring's producer pointer 1305 to point to the next available transmit descriptor included in the transmit descriptor ring 185.

At a later time, and referring to the example sequence of operations 1325 of FIG. 12, the NIC driver 125 initiates a DMA read operation (represented by the directed arrow 1330) to read the transmit descriptor 1320, which is at the location in the transmit descriptor ring 185 pointed to by the ring's consumer pointer 1310. The DMA operation 1330 initiated by the NIC 125 is processed by the IOMMU 170 in the chipset 135, which performs an address translation (represented by the directed arrow 1335) to map the guest physical address referenced by the transmit descriptor ring's producer pointer 1310 to the actual host physical address of the transmit descriptor 1320 in the transmit descriptor ring 185. The IOMMU 170 then performs the DMA read operation to retrieve and provide the contents of this transmit descriptor 1320 to the NIC 125.

Next, the NIC 125 obtains the transmit buffer address, which is the guest physical address that was configured by the NIC driver 155, from the retrieved descriptor 1320 and initiates a DMA read operation to read the data from this transmit buffer 165. Again, this DMA operation is processed by the IOMMU 170, which performs another address translation (represented by the directed arrow 1340) to map the guest physical address of the transmit buffer 165 to the actual host physical address of the transmit buffer 165 in the memory 120. The IOMMU 170 then performs the DMA read operation to retrieve and provide data from the transmit buffer 165 to the NIC 125 for transmission. Meanwhile, the NIC 125 also post-increments the transmit descriptor ring's consumer pointer 1310 to point to the next transmit descriptor in the transmit descriptor ring 185. As described in further detail below, the example techniques disclosed herein can reduce the DMA operation latency associated the address translations 1335 and/or 1340.

Returning to FIG. 1, from the foregoing example operations of the virtual processing environment 100, it can be seen that writing data from the NIC 125 to the memory 120, and reading data from the memory 120 to the NIC 125, involves at least two address translations, one translation to retrieve the appropriate descriptor, and another translation to access the buffer indexed by the descriptor. Such address translations can introduce latency in the DMA operations facilitated by the IOMMU 170, especially under circumstances in which the address translations are not cached locally in the IOMMU 170. For example, the IOMMU 170 can include a cache, such as an IOTLB, to store recently used address translations. However, when cache sizes are limited and/or buffers are located randomly in memory, it may not be possible for the IOMMU 170 to have the address translation for the next DMA operation in its cache. When an address translation is not cached, the IOMMU 170 performs a walk of its address translation page tables 175, which can be time consuming and reduce the performance of DMA operations facilitated by the IOMMU 170.

Figure 2:
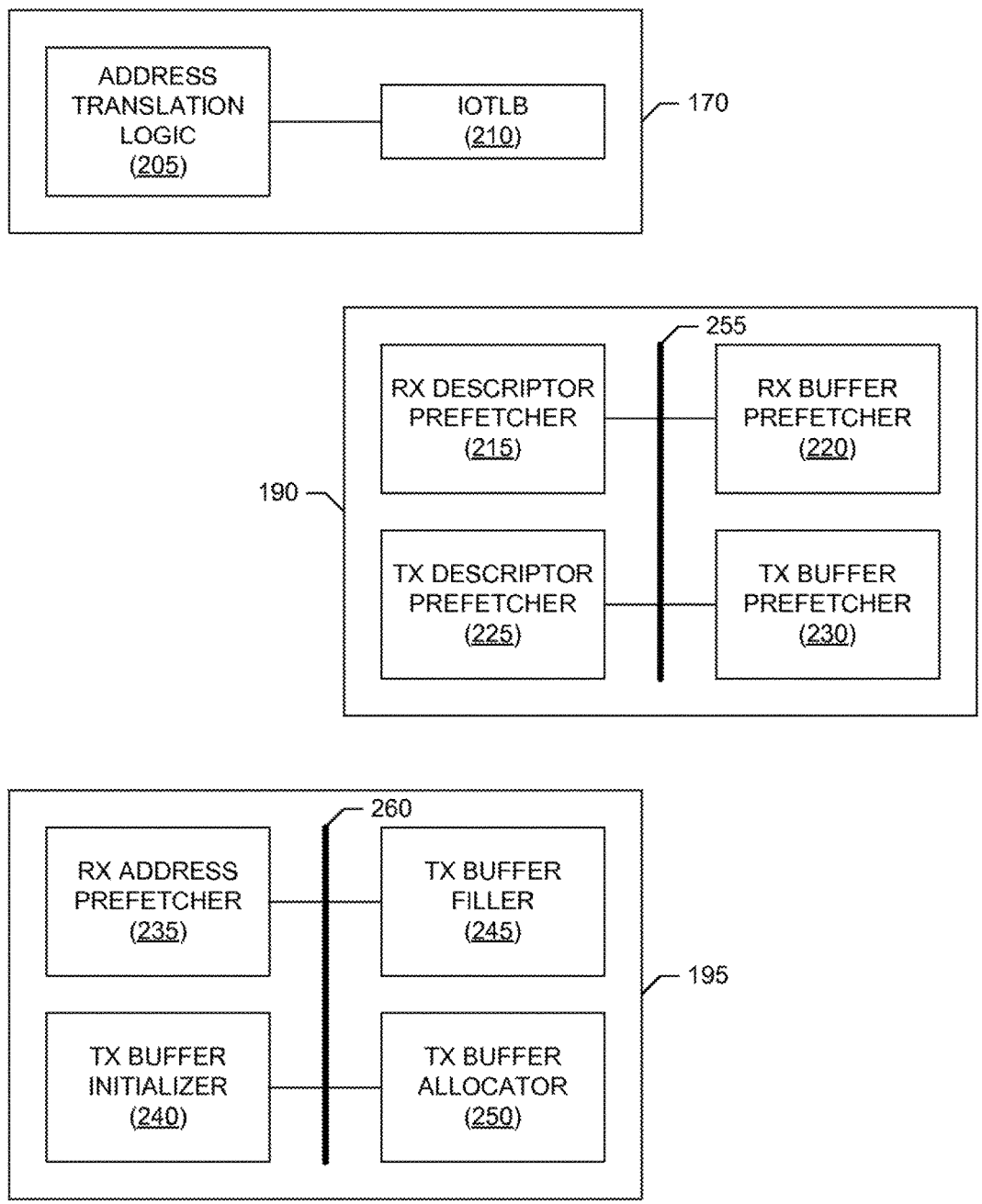
FIG. 2 illustrates block diagrams of an example input/output memory management unit (IOMMU), an example network interface card (NIC) DMA enhancer and an example NIC driver DMA enhancer that can be used to implement the example virtual processing environment of FIG. 1.

To reduce the latency associated with performing address translations for DMA operations, the virtual processing environment 100 of the illustrated example further includes an example NIC DMA enhancer 190 in the NIC 125, and an example NIC driver DMA enhancer 195 in the NIC driver 155. As described in detail below, the NIC DMA enhancer 190 causes the IOMMU 170 to prefetch one or more address translations associated with a next DMA operation to be performed such that the address translation(s) are cached in the IOMMU 170 by the time the next DMA operation is to be performed. As further described in detail below, the NIC driver DMA enhancer 195 can additionally or alternatively be used to cause the IOMMU 170 to prefetch one or more address translations associated with a next DMA operation to be performed such that the address translation(s) are cached in the IOMMU 170 by the time the next DMA operation is to be performed. In some examples, the NIC driver DMA enhancer 195 additionally or alternatively includes functionality to locate some or all of the buffers 160 and/or 165 in contiguous memory location, which may also help reduce the latency associated with DMA operations involving address translation. Example implementations of the NIC DMA enhancer 190 and the NIC driver DMA enhancer 195 are illustrated in FIG. 2, which is described in detail below.

Figure 11:
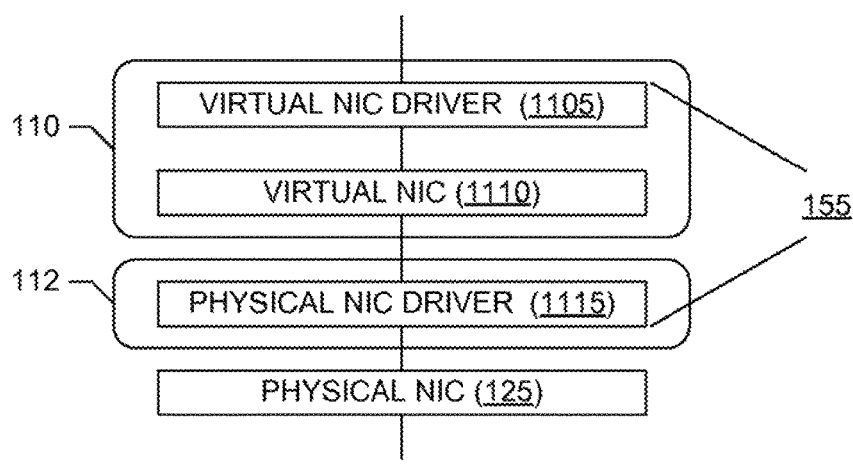
FIG. 11 is a block diagram of an example NIC driver that can include the example NIC driver DMA enhancer of FIG. 2 and that can be used to implement the example virtual processing environment of FIG. 1.

A block diagram of an example implementation of the NIC driver 155 of FIG. 1 that can include the example NIC driver DMA enhancer 195 is illustrated in FIG. 11. In the illustrated example of FIG. 11, the NIC driver 155 of FIG. 11 includes an example virtual NIC driver 1105, an example virtual NIC 1110 and an example physical NIC driver 1115, which can be implemented according to any conventional or otherwise appropriate technique. For example, in the NIC driver 155 of FIG. 11, each of the virtual NIC driver 1105 and the virtual NIC 1110 is implemented for and executes in the context of the virtual machine 110, whereas the physical NIC driver 1115 is implemented for and executes in the context of the hypervisor 112. Furthermore, in the illustrated example of FIG. 11, the virtual NIC driver 1105 of the virtual NIC driver 1105 is adapted to include the example NIC driver DMA enhancer 195 described above and in further detail below. However, in other examples, the NIC driver DMA enhancer 195 could be implemented by, for example, a paravirtualized NIC driver (not shown) implementing at least some of the functionality of the virtual NIC driver 1105, the virtual NIC 1110 and/or the physical NIC driver 1115.

Returning to FIG. 1, although the example virtual processing environment 100 illustrated in FIG. 1 includes one virtual machine 110, the disclosed example methods, apparatus and articles of manufacture for performing DMA operations involving address translation can be used in processing environments 100 having any number of virtual machines 110. For example, in such virtual processing environments 100, each virtual machine may be allocated respective receiver buffers 160, transmit buffers 165, and receive and transmit descriptor rings 180 and 185. In such examples, the IOMMU 170 can maintain respective sets of address translation page tables 175 and internal caches (e.g., IOTLBs) for the different virtual machines 110. The IOMMU 170 in such examples can select a particular set of address translation page tables 175 and/or a particular internal cache based on, for example, (1) a process identifier (ID) associated with the application 145 that is to transmit or receive the data, (2) a virtual local area network (VLAN) ID or other networking identifier included in the data received or to be transmitted by the NIC 125, (3) a virtual machine identifier, etc.

Also, although the disclosed example methods, apparatus and articles of manufacture for performing DMA operations involving address translation are described in the context of performing DMA operations associated with the NIC 125 of the example virtual processing environment 100, such example methods, apparatus and articles of manufacture can also be used to reduce latency associated with DMA operations performed by other I/O devices in a virtual processing environment. For example, the example NIC DMA enhancer 190 disclosed herein could be included in any I/O device that is to write data to and/or read data from a memory using DMA operations, and the NIC driver DMA enhancer 195 disclosed herein could be included in the virtual machine driver responsible for managing such an I/O device.

Furthermore, although the IOMMU 170 is shown as being included in the chipset 135 in the illustrated example virtual processing environment 100, the disclosed example methods, apparatus and articles of manufacture for performing DMA operations involving address translation are not limited thereto. For example, the IOMMU 170, and the associated address translation processing and caching, could be included in and/or otherwise implemented by the NIC 125 and/or any other I/O device that is to write data to and/or read data from a memory using DMA operations.

An example implementation of address translation functionality included in the IOMMU 170 of FIG. 1 is illustrated in FIG. 2. Other functionality included in the IOMMU 170 is omitted from the block diagram of FIG. 2 for clarity. Turning to FIG. 2, the IOMMU 170 of the illustrated example includes example address translation logic 205 configured to translate between guest physical memory addresses and host physical memory addresses in a virtual processing environment, such as the virtual processing environment 100 of FIG. 1. The example address translation logic 205 can implement address translation associated with any number and/or types of virtualization solutions, such as Intel's® Virtualization Technology for Directed I/O (VT-d), AMD's® Graphical Aperture Remapping Table, IBM's® Translation Control Entries, etc. The address translation logic 205 utilizes one or more address translation page tables, such as the address translation page tables 175, that are arranged in, for example, a hierarchical structure that is traversed, or "walked," by the address translation logic 205 to perform an address translation. For example, when the IOMMU 170 intercepts a DMA operation (e.g., a DMA write or a DMA read operation) that is to access a location in memory, such as in the memory 120 of FIG. 1, the address translation logic 205 reads the guest physical memory addresses specified in the DMA operation. The address translation logic 205 then walks the address translation page tables to determine the host physical address that is mapped to the guest physical address. The determined host physical address is then used in the DMA operation to enable the correct memory location to be accessed.

In the illustrated example of FIG. 2, the IOMMU 170 also includes an example IOTLB 210 to cache or, in other words, store address translations determined by the address translation logic 205. For example, the IOTLB 210 can include entries for storing mappings of guest physical addresses to host physical addresses determined by the address translation logic 205 from walking its address translation page tables. In an example operation, when the IOMMU 170 intercepts a DMA operation for accessing a location in memory, the IOMMU 170 determines whether the guest physical address specified in the DMA operation is cached in the IOTLB 210. If the guest physical address is cached in the IOTLB 210 (referred to as a cache hit), the IOMMU 170 can retrieve the host physical address mapped to this guest physical address without having to perform a potentially time consuming walk of its address translation page tables. However, if the guest physical address is not cached in the IOTLB 210 (referred to as a cache miss), the IOMMU 170 walks its address translation page tables to determine the host physical address corresponding to the guest physical address specified in the DMA operation. The determined mapping between this guest physical address and the host physical address is then cached in the IOTLB 210 to make this mapping available for subsequent DMA operations.

In the illustrated example of FIG. 2, the IOMMU 170 continues to cache address translation in the IOTLB 210 until the IOTLB 210 is full. Then, the IOMMU 170 implements any appropriate cache management technique to manage the inclusion and removal of the address translations in the IOTLB 210. For example, the IOMMU 170 can remove the oldest and/or least used address translation entries from its IOTLB 210 to make room for including a new address translation in the IOTLB 210. However, for scenarios in which the transmit and/or receive buffers 160 and 165 have a substantially random arrangement in memory, and/or are accessed in a substantially random order, such IOTLB management techniques may be unable to yield a satisfactory cache hit rate.

FIG. 2 also illustrates an example implementation of the NIC DMA enhancer 190. The example NIC DMA enhancer 190 of FIG. 2, which can be included in or otherwise implemented by the example NIC 125 of FIG. 1, includes an example receive descriptor prefetcher 215 to cause the IOMMU 170 in the example virtual processing environment 100 to prefetch address translations for receive descriptors included in the receive descriptor ring 180. In the illustrated example, the receive descriptor prefetcher 215 causes the IOMMU 170 to prefetch an address translation, which maps the guest physical address of a particular receive descriptor to the host physical address of that receive descriptor in the receive descriptor ring 180, before the IOMMU 170 is expected to need the address translation for processing a DMA operation that is to access the memory location of the receive descriptor. Such prefetching can increase the likelihood that the address translation for this receive descriptor will be cached in the IOTLB 210 of the IOMMU 170 when the address translation is actually needed, thereby avoiding a cache miss and the associated processing latency incurred when the address translation logic 205 of the IOMMU 170 has to resort to performing a page walk of its address translation page tables to determine the needed address translation.

As noted above, in some examples, the NIC driver 155 of the virtual machine 110 initializes the NIC 125 with the starting location and size of the receive descriptor ring 180 in the memory 120. The NIC driver 155 also initializes the producer and consumer pointers used to select the receive descriptors in the receive descriptor ring 180. For example, the NIC 125 reads the producer pointer of the receive descriptor ring 180 to obtain the guest physical address of the current receive descriptor in the receive descriptor ring 180 to which received data is to be stored via a DMA write operation. Once the current receive descriptor is retrieved and used to obtain the current receiver buffer 160 to which the current received data is to be stored, the NIC 125 increments the producer pointer of the receive descriptor ring 180 such that the producer pointer points to the next descriptor in the receive descriptor ring 180, which will be used for storing the next data received by the NIC 125.

In such examples, the receive descriptor prefetcher 215 can implement prefetching of a receive descriptor address translation as follows. After the NIC 125 has initiated a DMA write operation to store the current received data in the current receive buffer 160, and after the producer pointer of the receive descriptor ring 180 has been incremented to point to the next descriptor in the receive descriptor ring 180, the receive descriptor prefetcher 215 initiates a DMA read operation specifying the guest physical address pointed to by the producer pointer of the receive descriptor ring 180, which corresponds to the guest physical address of the next receive descriptor in the receive descriptor ring 180. However, the receive descriptor prefetcher 215 initiates this DMA read operation before the NIC 125 has actually received the next data (e.g., the next data packet) over the communication medium 140. In this way, the DMA read operation causes the IOMMU 170 to determine (if needed) and cache the address translation mapping the guest physical address of the next receive descriptor in the receive descriptor ring 180 to its host physical address before this address translation will be needed for storing the next data received over the communication medium 140. Also, because the DMA read operation initiated by the receive descriptor prefetcher 215 is a dummy read for the purposes of prefetching the address translation of the next receive descriptor in the receive descriptor ring 180, and is not used to store any received data, the producer pointer of the receive descriptor ring 180 is not incremented after the dummy DMA read operation is performed. Thus, the producer pointer of the receive descriptor ring 180 still points to the next receive descriptor (whose address translation was prefetched) in the receive descriptor ring 180 and is ready for use by the NIC 125 when the next data is received over the communication medium 140.

In some examples, the example NIC DMA enhancer 190 additionally or alternatively includes an example receive buffer prefetcher 220, as shown in the illustrated example of FIG. 2, to cause the IOMMU 170 to prefetch address translations for receive buffers 160 indexed by the receive descriptors included in the receive descriptor ring 180. In the illustrated example, the receive buffer prefetcher 220 causes the IOMMU 170 to prefetch an address translation, which maps the guest physical address of a particular receive buffer 160 to the host physical address of that receive buffer 160, before the IOMMU 170 is expected to need this address translation for processing a DMA operation that is to access the memory location of the receive buffer 160. Such prefetching can increase the likelihood that the address translation for this receive buffer 160 will be cached in the IOTLB 210 of the IOMMU 170 when the address translation is actually needed, thereby avoiding a cache miss and the associated processing latency incurred when the address translation logic 205 of the IOMMU 170 has to resort to performing a page walk of its address translation page tables to determine the needed address translation.

For example, the receive buffer prefetcher 220 can implement prefetching of a receive buffer address translation as follows. After the receive descriptor prefetcher 215 initiates the DMA read operation described above to cause the IOMMU 170 to prefetch the address translation associated with the next receive descriptor in the receive descriptor ring 180, the receive buffer prefetcher 220 reads the contents of the receive descriptor returned by the DMA read operation. These contents include the guest physical address of the receive buffer 160 indexed by this next receive descriptor in the receive descriptor ring 180. The receive buffer prefetcher 220 then initiates a DMA operation (which may be, for example, a dummy read operation or a dummy write operation) specifying the guest physical address of receive buffer 160 indexed by the next receive descriptor. However, the receive buffer prefetcher 220 initiates this DMA access of the next receive buffer 160 before the NIC 125 has actually received the next data (e.g., the next data packet) over the communication medium 140. In this way, the DMA access of the next receive buffer 160 causes the IOMMU 170 to determine (if needed) and cache the address translation mapping the guest physical address of the next receive buffer 160 to its host physical address before this address translation will be needed for storing the next data received overt the communication medium 140. Also, because the DMA operation initiated by the receive buffer prefetcher 220 is a dummy read (e.g., of data to be ignored) or a dummy write (e.g., of null data) for the purposes of prefetching the address translation of the next receive buffer 160, and is not used to store any received data or read any stored data, the success of this DMA operation is not signaled to the NIC driver 155. Accordingly, the NIC driver 155 is not aware of the DMA operations initiated by the receive buffer prefetcher 220 and/or the receive descriptor prefetcher 215 and, thus, does not attempt to read the dummy/null data that may have been stored to the memory location(s) specified in these (dummy) DMA operation(s).

In some examples, the example NIC DMA enhancer 190 additionally or alternatively includes an example transmit descriptor prefetcher 225, as shown in the illustrated example of FIG. 2, to cause the IOMMU 170 in the example virtual processing environment 100 to prefetch address translations for transmit descriptors included in the transmit descriptor ring 185 In the illustrated example, the transmit descriptor prefetcher 225 causes the IOMMU 170 to prefetch an address translation, which maps the guest physical address of a particular transmit descriptor to the host physical address of that transmit descriptor in the receive descriptor ring 185, before the IOMMU 170 is expected to need the address translation for processing a DMA operation that is to access the memory location of the transmit descriptor. Similar to the receive descriptor prefetching performed by the receive descriptor prefetcher 215 described above, such transmit descriptor prefetching can increase the likelihood that the address translation for this transmit descriptor will be cached in the IOTLB 210 of the IOMMU 170 when this address translation is actually needed, thereby avoiding a cache miss and the associated processing latency incurred when the address translation logic 205 of the IOMMU 170 has to resort to performing a page walk of its address translation page tables to determine the needed address translation.

As noted above, in some examples, the NIC driver 155 of the virtual machine 110 initializes the NIC 125 with the starting location and size of the transmit descriptor ring 185 in the memory 120. The NIC driver 155 also initializes the producer and consumer pointers used to select the transmit descriptors in the transmit descriptor ring 185. For example, the NIC 125 reads the consumer pointer of the transmit descriptor ring 185 to obtain the guest physical address of the current transmit descriptor in the transmit descriptor ring 185 from which transmit data is to be obtained via a DMA read operation. Once the current transmit descriptor is retrieved and used to obtain the current transmit buffer 165 from which the current data for transmission is to be retrieved, the NIC 125 increments the consumer pointer of the transmit descriptor ring 185 such that the consumer pointer points to the next descriptor in the transmit descriptor ring 185, which will be used for retrieving the next data for transmission by the NIC 125.

In such examples, the transmit descriptor prefetcher 225 can implement prefetching of a transmitter descriptor address translation as follows. After the NIC 125 has initiated a DMA read operation to retrieve, for transmission, the transmit data stored in the current transmit buffer 165, and after the consumer pointer of the transmit descriptor ring 185 has been incremented to point to the next descriptor in the transmit descriptor ring 185, the transmit descriptor prefetcher 225 initiates a DMA read operation specifying the guest physical address pointed to by the consumer pointer of the transmit descriptor ring 185, which corresponds to the guest physical address of the next transmit descriptor in the transmit descriptor ring 185. However, the transmit descriptor prefetcher 225 initiates this DMA read operation before the NIC 125 has actually received a command from the NIC driver 155 indicating the next transmit data (e.g., the next transmit data packet) is ready for transmission over the communication medium 140. In this way, the DMA read operation causes the IOMMU 170 to determine (if needed) and cache the address translation mapping the guest physical address of the next transmit descriptor in the transmit descriptor ring 185 to its host physical address before this address translation will be needed for retrieving the next data to be transmitted over the communication medium 140. Also, because the DMA read operation initiated by the transmit descriptor prefetcher 225 is a dummy read for the purposes of prefetching the address translation of the next transmit descriptor in the transmit descriptor ring 185, and is not used to retrieve any data for transmission, the consumer pointer of the transmit descriptor ring 185 is not incremented after the dummy DMA read operation is performed. Thus, the consumer pointer of the transmit descriptor ring 185 still points to the next transmit descriptor (whose address translation was prefetched) in the transmit descriptor ring 185 and is ready for use by the NIC 125 when the NIC driver 155 indicates that next transmit data is ready for transmission over the communication medium 140.

In some examples, the example NIC DMA enhancer 190 additionally or alternatively includes an example transmit buffer prefetcher 230, as shown in the illustrated example of FIG. 2, to cause the IOMMU 170 to prefetch address translations for transmit buffers 165 indexed by the transmit descriptors included in the transmit descriptor ring 185. In the illustrated example, the transmit buffer prefetcher 230 causes the IOMMU 170 to prefetch an address translation, which maps the guest physical address of a particular transmit buffer 165 to the host physical address of that transmit buffer 165, before the IOMMU 170 is expected to need this address translation for processing a DMA operation that is to access the memory location of the transmit buffer 165. Such prefetching can increase the likelihood that the address translation for this transmit buffer 165 will be cached in the IOTLB 210 of the IOMMU 170 when the address translation is actually needed, thereby avoiding a cache miss and the associated processing latency incurred when the address translation logic 205 of the IOMMU 170 has to resort to performing a page walk of its address translation page tables to determine the needed address translation.

For example, the transmit buffer prefetcher 230 can implement prefetching of a transmit buffer address translation as follows. After the transmit descriptor prefetcher 225 initiates the DMA read operation described above to cause the IOMMU 170 to prefetch the address translation associated with the next transmit descriptor in the transmit descriptor ring 185, the transmit buffer prefetcher 230 reads the contents of the transmit descriptor returned by the DMA read operation. These contents include the guest physical address of the transmit buffer 165 indexed by this next transmit descriptor in the transmit descriptor ring 180. The transmit buffer prefetcher 230 then initiates a DMA operation (which may be, for example, a dummy read operation or a dummy write operation) specifying the guest physical address of transmit buffer 165 indexed by the next transmit descriptor. However, the transmit buffer prefetcher 230 initiates this DMA access of the next transmit buffer 165 before the NIC 125 has actually received an indication (e.g., from the NIC driver 155) that the next data (e.g., the next data packet) is ready for transmission over the communication medium 140. In this way, the DMA access of the next transmit buffer 165 causes the IOMMU 170 to determine (if needed) and cache the address translation mapping the guest physical address of the next transmit buffer 165 to its host physical address before this address translation will be needed for retrieving the next data to be transmitted over the communication medium 140. Also, because the DMA operation initiated by the transmit buffer prefetcher 230 is a dummy read (e.g., of data to be ignored) or dummy write (e.g., of null data) for the purposes of prefetching the address translation of the next transmit buffer 165, and is not used to retrieve any data for transmission or store any data, the success of this DMA operation is not signaled to the NIC driver 155. Accordingly, the NIC driver 155 is not aware of the DMA operations initiated by the transmit buffer prefetcher 230 and/or the transmit descriptor prefetcher 225.

In the example NIC DMA enhancer 190 of FIG. 2, the receive descriptor prefetcher 215, the receive buffer prefetcher 220, the transmit descriptor prefetcher 225 and the transmit buffer prefetcher 230 are illustrated as being communicatively coupled to example interface logic 255, which permits information to be exchanged among some of all of the foregoing blocks (e.g., depending upon which blocks are included in an example implementation). The interface logic 255 can be implemented by, for example, but not limited to, any number and/or type(s) of communication/control links/busses, digital logic, software interfaces, etc.

FIG. 2 further illustrates an example implementation of the NIC driver DMA enhancer 195. The example NIC driver DMA enhancer 195 of FIG. 2, which can be included in or otherwise implemented by the example NIC driver 155 of FIG. 1, includes an example receive address prefetcher 235 to cause the IOMMU 170 in the example virtual processing environment 100 to prefetch address translations for receive buffers 160 and/or receive descriptors included in the receive descriptor ring 180. In the illustrated example, the receive address prefetcher 235 can be used in addition or as an alternative to the receive descriptor prefetcher 215 and/or the receiver buffer prefetcher 220 of the NIC DMA enhancer 190 for causing the IOMMU 170 to prefetch an address translation, which maps the guest physical address of a particular receive descriptor or receive buffer 160 to the host physical address of that receive descriptor or receive buffer 160, before the IOMMU 170 is expected to need the address translation for processing a DMA operation that is to access the memory location of the receive descriptor or the receiver buffer 160. As noted above, such prefetching can increase the likelihood that the address translation for this receive descriptor or the receive buffer 160 will be cached in the IOTLB 210 of the IOMMU 170 when the address translation is actually needed, thereby avoiding a cache miss and the associated processing latency incurred when the address translation logic 205 of the IOMMU 170 has to resort to performing a page walk of its address translation page tables to determine the needed address translation.

In some examples, the receive address prefetcher 235 of the NIC driver DMA enhancer 195 illustrated in the example of FIG. 2 implements address translation prefetching for the next receive descriptor in the receive descriptor ring 180 as follows. After receiving an indication that a DMA write operation for writing current received data to a current receive buffer 160 has completed successfully, the receive address prefetcher 235 reads the guest physical address pointed to by the producer pointer of the receive descriptor ring 180. This address pointed to by the producer pointer of the receive descriptor ring 180 corresponds to the guest physical address of the next receive descriptor in the receive descriptor ring 180 that is to be used by the NIC 125 for storing the next data (e.g., the next data packet) to be received over the communication medium 140. The receive address prefetcher 235 then prepares a new transmit command that is to cause the NIC 125 to transmit data stored at a location specified in the transmit command, rather than using the consumer pointer of the transmit descriptor ring 185 to determine the location of the data to be transmitted. In the illustrated example, the receive address prefetcher 235 specifies, in the new transmit command, the guest physical address of the next receive descriptor pointed to be the producer pointer of the receive descriptor ring 180 as the location of the data to be transmitted. The receive address prefetcher 235 then causes the NIC driver 155 to issue this new transmit command to the NIC 125 (which has been modified to recognize this new transmit command), which causes the NIC 125 to issue a DMA read operation to read the data at the location specified in the new transmit command. The DMA read operation causes the IOMMU 170 to determine (if needed) and cache the address translation mapping the guest physical address of the next receive descriptor, which is specified in the new transmit command issued by the NIC driver 155, to its host physical address of this descriptor in the receive descriptor ring 180. In this way, the address translation mapping the guest physical address of this next receive descriptor to its host physical address is already cached in the IOTLB 210 of the IOMMU 170 before this address translation is needed for storing the next data received by the NIC 125. Also, in some examples, the receive address prefetcher 235 causes the NIC driver 155 to indicate that the new transmit command is to be no-operation (NOP) transmit command that is to cause the NIC 125 to access the memory location specified in the transmit command, but not actually read or transmit the data stored at that memory location. For example, the NIC driver 155 can indicate that the new transmit command is a NOP transmit command by setting an appropriate flag in the transmit command, but specifying a negative or otherwise invalid length for the data to be transmitted, etc.

In some examples, the example NIC driver DMA enhancer 195 additionally or alternatively includes an example transmit buffer initializer 240 and an example transmit buffer filler 245, as shown in the illustrated example of FIG. 2. As noted above, in some examples, the NIC driver 155 programs the next transmit descriptor in the transmit descriptor ring 185 (e.g., as pointed to by the producer pointer of the transmit descriptor ring 185) with the next transmit buffer 165 storing the next data to be transmitted. The NIC driver 155 in such examples may program the next transmit descriptor with the guest physical address of this transmit buffer 165 just before the data stored in this buffer is to be retrieved for transmission. As such, the NIC driver 155 may change the guest physical address of the transmit buffer 165 indexed by the next transmit descriptor after the next transmit descriptor has been prefetched by the transmit descriptor prefetcher 225 of the example NIC DMA enhancer 190. In such examples, the resulting transmit buffer address translation that is caused to be prefetched by the transmit buffer prefetcher 230 may correspond to an old transmit buffer and, thus, the resulting address translation cached by the IOMMU 170 in its IOTLB 210 may not correspond to the actual next transmit buffer 165 subsequently programmed by the NIC driver 155 into the next transmit descriptor. Accordingly, a cache miss may result when the NIC 125 later attempts to retrieve the data stored in the actual (e.g., updated) transmit buffer 165 indexed by the next transmit descriptor. Such behavior can occur, for example, in zero-copy implementations in which transmit buffers 165 are allocated as needed to the applications 145 executing in the virtual machine 110, and a particular application 145 that is to transmit data calls or otherwise signals the NIC driver 155 with a pointer to the transmit buffer 165 in which the data is stored, which the NIC driver 155 then programs into the next transmit descriptor in the transmit descriptor ring 185.

To reduce the likelihood of cache misses occurring in the context of transmit buffer address translation, the transmit buffer initializer 240 of the example NIC driver DMA enhancer 195 initializes a subset of the transmit buffers 165 for use by the NIC driver 155, and initializes the transmit descriptors in the transmit descriptor 185 with the guest physical addresses of this subset of the transmit buffers 165. Then, when a particular application 145 that is to transmit data calls or otherwise signals the NIC driver 155 with a pointer to the application's transmit buffer 165 in which the transmit data is stored, the transmit buffer filler 245 of the example NIC driver DMA enhancer 195 copies the data stored in the application's transmit buffer 165 to the NIC driver's transmit buffer 165 that is indexed by the next transmit descriptor in the transmit descriptor ring 185 (e.g., as pointed to by the ring's producer pointer). (As such, the transmit buffers 165 allocated to the NIC driver 155 are also referred to herein as transmit copy buffers.) The NIC driver 155 then issues a transmit command to the NIC 125 indicating that there is data ready to be transmitted. In this way, the transmit buffers 165 indexed by the transmit descriptors in the transmit descriptor ring 185 remain unchanged such that prefetching of the transmit buffer address translations is accurate and results in cache hits when the transmit buffers 165 indexed by the transmit descriptors are later accessed by the NIC 125 to retrieve the data for transmission.

In some examples, the example NIC driver DMA enhancer 195 additionally or alternatively includes the example transmit buffer initializer 240 and an example transmit buffer allocator 250, as shown in the illustrated example of FIG. 2, to reduce the random nature in which the transmit buffers 165 are located and used while still permitting zero-copy transmit implementations. For example, the transmit buffer initializer 240 can be configured to initialize some or all of the transmit buffers 165 to be located in one or more contiguous regions of memory 120 that can be indexed, for example, using fewer than all of the address translation page tables 175 employed by the IOMMU 170. The transmit buffer initializer 240 also initially reserves these transmit buffers 165 for use by the NIC driver 155. In such examples, the transmit buffer allocator 250 exposes or otherwise implements an application programming interface (API) (or any other interface) via which an application 145 can request to be allocated one or more of the transmit buffers 165 initially reserved for use by the NIC driver 155. Then, in response to receiving a request from the application 145 via this interface, the transmit buffer allocator 250 allocates the requested number of transmit buffers 165 to the requesting application 145. In this way, because the transmit buffers 165 initially reserved for the NIC driver 155 and subsequently allocated to the application(s) 145 are located in contiguous region(s) of memory 120, the IOMMU 170 can perform address translations for these transmit buffers 165 by walking fewer than the total number of page tables used by the IOMMU 170, which can reduce the latency incurred by the IOMMU 170 when performing address translations.

In the example NIC driver DMA enhancer 195 of FIG. 2, the receive address prefetcher 235, the transmit buffer initializer 240, the transmit buffer filler 245 and the transmit buffer allocator 250 are illustrated as being communicatively coupled to example interface logic 260, which permits information to be exchanged with and/or among some of all of the foregoing blocks (e.g., depending upon which blocks are included in an example implementation). The interface logic 260 can be implemented by, for example, but not limited to, any number and/or type(s) of communication/control links/busses, digital logic, software interfaces, etc.

While an example manner of implementing the virtual processing environment 100 is illustrated in FIGS. 1-2, one or more of the elements, processes and/or devices illustrated in FIGS. 1-2 may be combined, divided, re-arranged, omitted, eliminated and/or implemented in any other way. Further, the example host processor 105, the example virtual machine 110, the example hypervisor 112, the example system bus 115, the example memory 120, the example NIC 125, the example external interface bus 130, the example chipset 135, the example communication medium 140, the example application(s) 145, the example protocol stack 150, the example NIC driver 155, the example IOMMU 170, the example NIC DMA enhancer 190, the example NIC driver DMA enhancer 195, the example virtual NIC driver 1105, the example virtual NIC 1110, the example physical NIC driver 1115, the example address translation logic 205, the example IOTLB 210, the example receive descriptor prefetcher 215, the example receive buffer prefetcher 220, the example transmit descriptor prefetcher 225, the example transmit buffer prefetcher 230, the example receive address prefetcher 235, the example transmit buffer initializer 240, the example transmit buffer filler 245, the example transmit buffer allocator 250 and/or, more generally, the example virtual processing environment 100 may be implemented by hardware, software, firmware and/or any combination of hardware, software and/or firmware. Thus, for example, any of the example host processor 105, the example virtual machine 110, the example hypervisor 112, the example system bus 115, the example memory 120, the example NIC 125, the example external interface bus 130, the example chipset 135, the example communication medium 140, the example application(s) 145, the example protocol stack 150, the example NIC driver 155, the example IOMMU 170, the example NIC DMA enhancer 190, the example NIC driver DMA enhancer 195, the example virtual NIC driver 1105, the example virtual NIC 1110, the example physical NIC driver 1115, the example address translation logic 205, the example IOTLB 210, the example receive descriptor prefetcher 215, the example receive buffer prefetcher 220, the example transmit descriptor prefetcher 225, the example transmit buffer prefetcher 230, the example receive address prefetcher 235, the example transmit buffer initializer 240, the example transmit buffer filler 245, the example transmit buffer allocator 250 and/or, more generally, the example virtual processing environment 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s), such as field programmable gate array(s) (FPGA(s)). When reading any of the apparatus or system claims of this patent to cover a purely software and/or firmware implementation, at least one of the example virtual processing environment 100, the example host processor 105, the example virtual machine 110, the example hypervisor 112, the example system bus 115, the example memory 120, the example NIC 125, the example external interface bus 130, the example chipset 135, the example communication medium 140, the example application(s) 145, the example protocol stack 150, the example NIC driver 155, the example IOMMU 170, the example NIC DMA enhancer 190, the example NIC driver DMA enhancer 195, the example virtual NIC driver 1105, the example virtual NIC 1110, the example physical NIC driver 1115, the example address translation logic 205, the example IOTLB 210, the example receive descriptor prefetcher 215, the example receive buffer prefetcher 220, the example transmit descriptor prefetcher 225, the example transmit buffer prefetcher 230, the example receive address prefetcher 235, the example transmit buffer initializer 240, the example transmit buffer filler 245 and/or the example transmit buffer allocator 250 is/are hereby expressly defined to include a tangible computer readable storage device or storage disk such as a memory, a digital versatile disk (DVD), a compact disk (CD), a Blu-ray disk, etc. storing the software and/or firmware. Further still, the example virtual processing environment 100 of FIG. 1 may include one or more elements, processes and/or devices in addition to, or instead of, those illustrated in FIGS. 1-2, and/or may include more than one of any or all of the illustrated elements, processes and devices.

Flowcharts representative of example machine readable instructions for implementing the example virtual processing environment 100, the example host processor 105, the example virtual machine 110, the example hypervisor 112, the example system bus 115, the example memory 120, the example NIC 125, the example external interface bus 130, the example chipset 135, the example communication medium 140, the example application(s) 145, the example protocol stack 150, the example NIC driver 155, the example IOMMU 170, the example NIC DMA enhancer 190, the example NIC driver DMA enhancer 195, the example virtual NIC driver 1105, the example virtual NIC 1110, the example physical NIC driver 1115, the example address translation logic 205, the example IOTLB 210, the example receive descriptor prefetcher 215, the example receive buffer prefetcher 220, the example transmit descriptor prefetcher 225, the example transmit buffer prefetcher 230, the example receive address prefetcher 235, the example transmit buffer initializer 240, the example transmit buffer filler 245 and/or the example transmit buffer allocator 250 of FIGS. 1-2 are shown in FIGS. 3-9. In these examples, the machine readable instructions comprise one or more programs for execution by a processor such as the processor 1012 shown in the example processor platform 1000 discussed below in connection with FIG. 10. The program(s) may be embodied in software stored on a tangible computer readable storage medium such as a CD-ROM, a floppy disk, a hard drive, a digital versatile disk (DVD), a Blu-ray disk, or a memory associated with the processor 1012, but the entire program(s) and/or parts thereof could alternatively be executed by a device other than the processor 1012 and/or embodied in firmware or dedicated hardware. Further, although the example program(s) is(are) described with reference to the flowcharts illustrated in FIGS. 3-9, many other methods of implementing the example virtual processing environment 100, the example host processor 105, the example virtual machine 110, the example hypervisor 112, the example system bus 115, the example memory 120, the example NIC 125, the example external interface bus 130, the example chipset 135, the example communication medium 140, the example application(s) 145, the example protocol stack 150, the example NIC driver 155, the example IOMMU 170, the example NIC DMA enhancer 190, the example NIC driver DMA enhancer 195, the example virtual NIC driver 1105, the example virtual NIC 1110, the example physical NIC driver 1115, the example address translation logic 205, the example IOTLB 210, the example receive descriptor prefetcher 215, the example receive buffer prefetcher 220, the example transmit descriptor prefetcher 225, the example transmit buffer prefetcher 230, the example receive address prefetcher 235, the example transmit buffer initializer 240, the example transmit buffer filler 245 and/or the example transmit buffer allocator 250 may alternatively be used. For example, the order of execution of the blocks may be changed, and/or some of the blocks described may be changed, eliminated, or combined.

As mentioned above, the example processes of FIGS. 3-9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 3-9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

Figure 3:
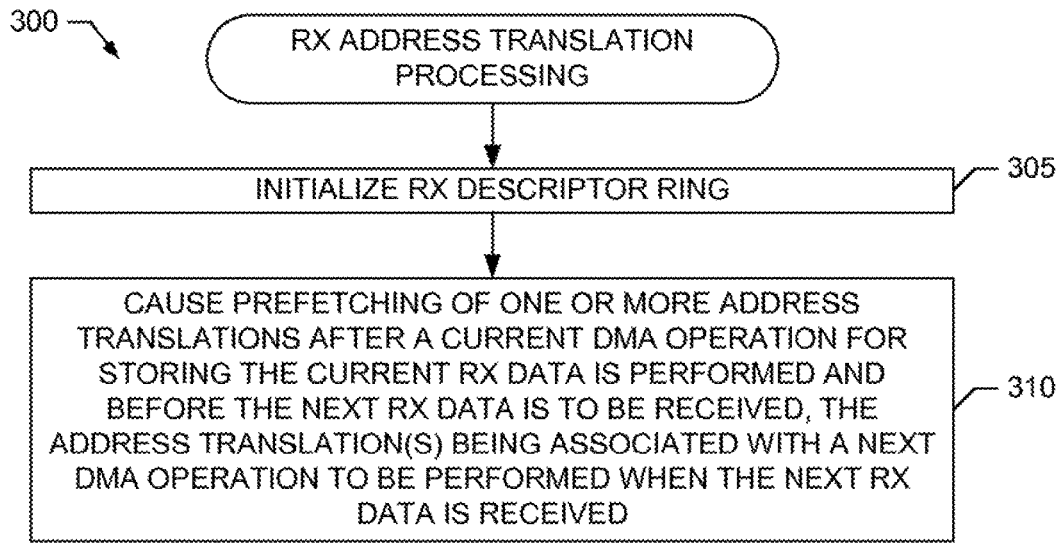
FIG. 3 is a flowchart representative of example machine readable instructions that may be executed to implement address translation processing for received data DMA operations in the example virtual processing environment of FIG. 1.

Example machine readable instructions 300 that may be executed to implement address translation processing for DMA operations associated with receiving data in the example virtual processing environment 100 of FIG. 1 are illustrated in FIG. 3. With reference to the preceding figures and associated descriptions, the example machine readable instructions 300 of FIG. 3 begin execution at block 305 at which the NIC driver 155 of the virtual machine 110 executing in the virtual processing environment 100 initializes the receive descriptor ring 180, which stores the receive descriptors indexing the receive buffers 160 to be used by the NIC 125 and the NIC driver 155 for storing and retrieving data received via the communication medium 140. Then, at block 310, the NIC 125 and/or the NIC driver 155 cause, as described above, prefetching of one or more address translations to be performed (e.g., by the IOMMU 170) after a current DMA operation for storing the current data received by the NIC 125 has been performed and before the next data is to be received by the NIC 125. As described above, the address translation(s) prefetched at block 310 are associated with a next DMA operation to be performed to store the next data received by the NIC 125. For example, the address translation(s) prefetched at block 310 can correspond to an address translation mapping a guest physical address of the next receive descriptor in the receive descriptor ring 180 to its host physical address, and/or an address translation mapping a guest physical address of the next receive buffer 160 indexed by the next receive descriptor to the host physical address of this receive buffer 160. The processing at block 310 can then be repeated indefinitely or until the virtual processing environment 100 is rebooted, restarted, reinitialized, etc.

Figure 4:
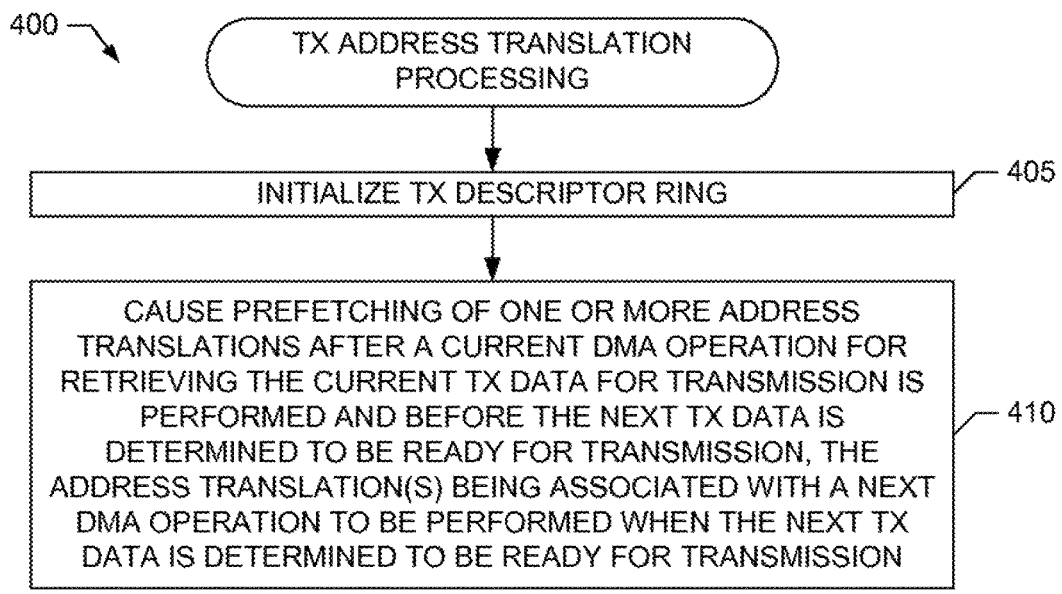
FIG. 4 is a flowchart representative of example machine readable instructions that may be executed to implement address translation processing for transmit data DMA operations in the example virtual processing environment of FIG. 1.

Example machine readable instructions 400 that may be executed to implement address translation processing for DMA operations associated with transmitting data in the example virtual processing environment 100 of FIG. 1 are illustrated in FIG. 4. With reference to the preceding figures and associated descriptions, the example machine readable instructions 400 of FIG. 4 begin execution at block 405 at which the NIC driver 155 of the virtual machine 110 executing in the virtual processing environment 100 initializes the transmit descriptor ring 185, which stores the transmit descriptors indexing the transmit buffers 165 to be used by the NIC 125 and the NIC driver 155 for storing and retrieving data to be transmitted via the communication medium 140. Then, at block 410, the NIC 125 and/or the NIC driver 155 cause, as described above, prefetching of one or more address translations to be performed (e.g., by the IOMMU 170) after a current DMA operation for retrieving the current data for transmission by the NIC 125 has been performed and before the next data is determined to be ready for transmission. As described above, the address translation(s) prefetched at block 410 are associated with a next DMA operation to be performed to retrieve the next data to be transmitted by the NIC 125. For example, the address translation(s) prefetched at block 410 can correspond to an address translation mapping a guest physical address of the next transmit descriptor in the transmit descriptor ring 185 to its host physical address, and/or an address translation mapping a guest physical address of the next transmit buffer 165 indexed by the next transmit descriptor to the host physical address of this transmit buffer 165. The processing at block 410 can then be repeated indefinitely or until the virtual processing environment 100 is rebooted, restarted, reinitialized, etc.

Figure 5:
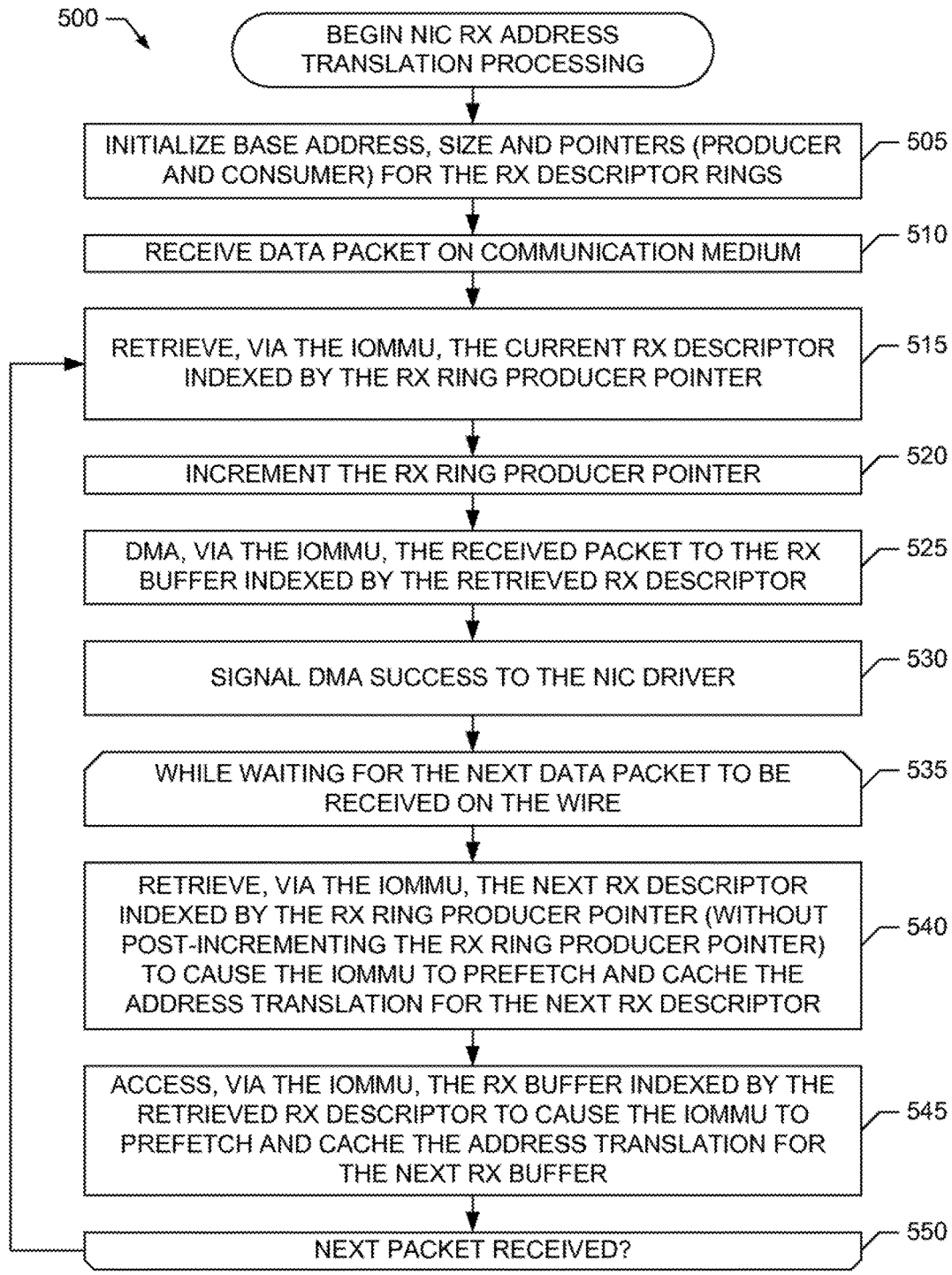
FIG. 5 is a flowchart representative of example machine readable instructions that may be executed to implement address translation processing for the receive path in the example NIC DMA enhancer of FIG. 2.

Example machine readable instructions 500 that may be executed to implement, in the NIC 125 of FIG. 1, address translation processing for DMA operations associated with receiving data are illustrated in FIG. 5. The example machine readable instructions 500 correspond to an example implementation by the NIC 125 of the functionality provided by the example machine readable instructions 300 of FIG. 3. With reference to the preceding figures and associated descriptions, the example machine readable instructions 500 of FIG. 5 begin execution at block 505 at which the NIC 125 is initialized by the NIC driver 155 with the base address, size, and the producer and consumer pointers of the receive descriptor ring 180. At block 510, the NIC 125 receives a current received data packet via the communication medium 140. At block 515, the NIC 125 initiates a DMA read operation to retrieve, via the IOMMU 170, the current receive descriptor pointed to (or indexed by) the producer pointer of the receive descriptor ring 180. As described above, the current receive descriptor indexes (e.g., by including the guest physical address of) the current receiver buffer 160 to be used to store the data received at block 510. At block 520, the NIC 125 post-increments the producer pointer of the receive descriptor ring 180 to point to the next receive descriptor in the receive descriptor ring 180. As described above, the next receive descriptor indexes (e.g., by including the guest physical address of) the next receiver buffer 160 to be used to store the next data to be received by the NIC 125 in the future. At block 525, the NIC 125 initiates a DMA write operation to store, via the IOMMU 170, the data received at block 510 to the receive buffer 160 indexed by the receive descriptor retrieved at block 515. At block 530, the success of the DMA write operation performed at block 530 is signaled to the NIC driver 155.

Next, while the NIC 125 is waiting for the next data packet to be received via the communication medium 140 (block 535), the processing at blocks 540 and/or 545 is performed. At block 540, the receive descriptor prefetcher 215 of the NIC 125 causes the IOMMU 170 to prefetch and cache an address translation mapping the guest physical address of the next receive descriptor pointed to by the producer pointer of the receive descriptor ring 180 to the host physical address of this receive descriptor. As described above, the receive descriptor prefetcher 215 of the NIC 125 causes the prefetching at block 540 to be performed by, for example, initiating a DMA read operation to read the guest physical address pointed to by the producer pointer of the receive descriptor ring 180, which corresponds to the guest physical address of the next receive descriptor in the receive descriptor ring 180. As further described above, the DMA read operation performed at block 540 causes the IOMMU 170 to determine (if necessary) and cache the address translation mapping the guest physical address of the next receive descriptor to its host physical address. However, because the next receive descriptor is not being read to actually store any received data, the producer pointer of the receive descriptor ring 180 is not post-incremented at block 540.

At block 545, the receive buffer prefetcher 220 of the NIC 125 causes the IOMMU 170 to prefetch and cache an address translation mapping the guest physical address of the next receive buffer 160 indexed by the next receive descriptor retrieved at block 540 to the host physical address of this receive buffer 160. As described above, the receive buffer prefetcher 220 of the NIC 125 causes the prefetching at block 545 to be performed by, for example, initiating a DMA operation (e.g., a dummy read or a dummy write) to access the guest physical address of the receive buffer 160 included in the next receive descriptor retrieved at block 540. As further described above, the DMA operation performed at block 545 causes the IOMMU 170 to determine (if necessary) and cache the address translation mapping the guest physical address of the next receive buffer 160 to its host physical address. Then, when the next packet is received by the NIC 125 (block 550), processing returns to block 515 and the blocks subsequent thereto at which the NIC 125 initiates DMA operations to store this next packet received via the communication medium 140. Due to the prefetching performed at block 540 and/or 545, there may be a higher likelihood of achieving cache hits when performing the address translations for the DMA operations initiated to store this next received data.

Figure 6:
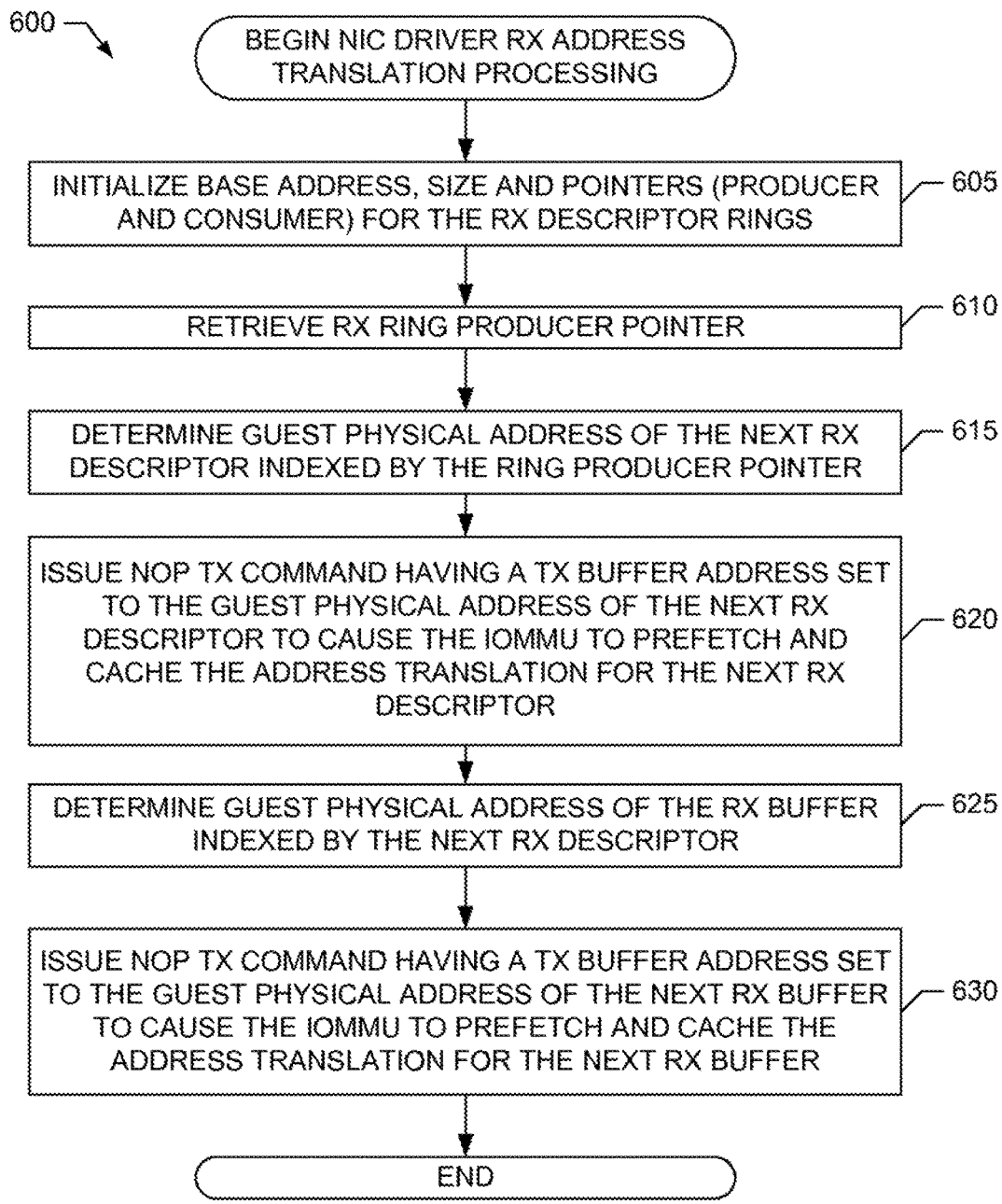
FIG. 6 is a flowchart representative of example machine readable instructions that may be executed to implement address translation processing for the receive path in the example NIC driver DMA enhancer of FIG. 2.

Example machine readable instructions 600 that may be executed to implement, in the NIC driver 155 of FIG. 1, address translation processing for DMA operations associated with receiving data are illustrated in FIG. 6. The example machine readable instructions 600 correspond to an example implementation by the NIC driver 155 of the functionality provided by the example machine readable instructions 300 of FIG. 3. With reference to the preceding figures and associated descriptions, the example machine readable instructions 600 of FIG. 6 begin execution at block 605 at which the NIC driver 155 initializes the base address, size, and the producer and consumer pointers of the receive descriptor ring 180. At block 610, the receive address prefetcher 235 of the NIC driver 155 retrieves the producer pointer of the receive descriptor ring 180. For example, the processing at block 610 can be invoked by the receive address prefetcher 235 of the NIC driver 155 after receiving an indication that a DMA operation for storing current received data has succeeded and while waiting for the next such indication.

At block 615, the receive address prefetcher 235 of the NIC driver 155 determines the guest physical address of the receive descriptor pointed to by the producer pointer of the receive descriptor ring 180. This receive descriptor corresponds to the next receive descriptor to be used by the NIC 125 for storing the next data packet received via the communication medium 140. At block 620, the receive address prefetcher 235 of the NIC driver 155 issues the new transmit command disclosed above, which has a transmit buffer address set to the guest physical address of the receive descriptor determined at block 615. The transmit command issued by the NIC driver 155 at block 620 causes the NIC 125 to initiate a DMA read operation to read the data stored at the guest physical address of the receive descriptor, which in turn causes the IOMMU 170 to determine (if necessary) and cache, in its IOTLB 210, an address translation mapping the guest physical address of this receive descriptor to its host physical address. As described above, the transmit command issued at block 620 can be configured to be a NOP transmit command such that the NIC 125 does not actually transmit the data read from the next receive descriptor via the DMA read operation.

In some examples, at block 625 the receive address prefetcher 235 of the NIC driver 155 further determines the guest physical address of the receive buffer 160 indexed by the next receive descriptor. This receive buffer 160 corresponds to the next receive buffer 160 to be used by the NIC 125 for storing the next data packet received via the communication medium 140. In such examples, at block 630 the receive address prefetcher 235 of the NIC driver 155 issues another new transmit command, which at block 630 has a transmit buffer address set to the guest physical address of the receive buffer 160 determined at block 625. The transmit command issued by the receive address prefetcher 235 of the NIC driver 155 at block 630 causes the NIC 125 to initiate a DMA read operation to read the data stored at the guest physical address of the next receive buffer 160, which in turn causes the IOMMU 170 to determine (if necessary) and cache, in its IOTLB 210, an address translation mapping the guest physical address of this next receive buffer 160 to its host physical address. As described above, the transmit command issued at block 630 can be configured to be a NOP transmit command such that the NIC 125 does not actually transmit the data read via from the next receive buffer 160 via the DMA read operation. Due to the prefetching performed at block 620 and/or 630, there may be a higher likelihood of achieving cache hits when performing address translations for the next DMA operations initiated by the NIC 125 to store this next data received via the communication medium 140.

Figure 7:
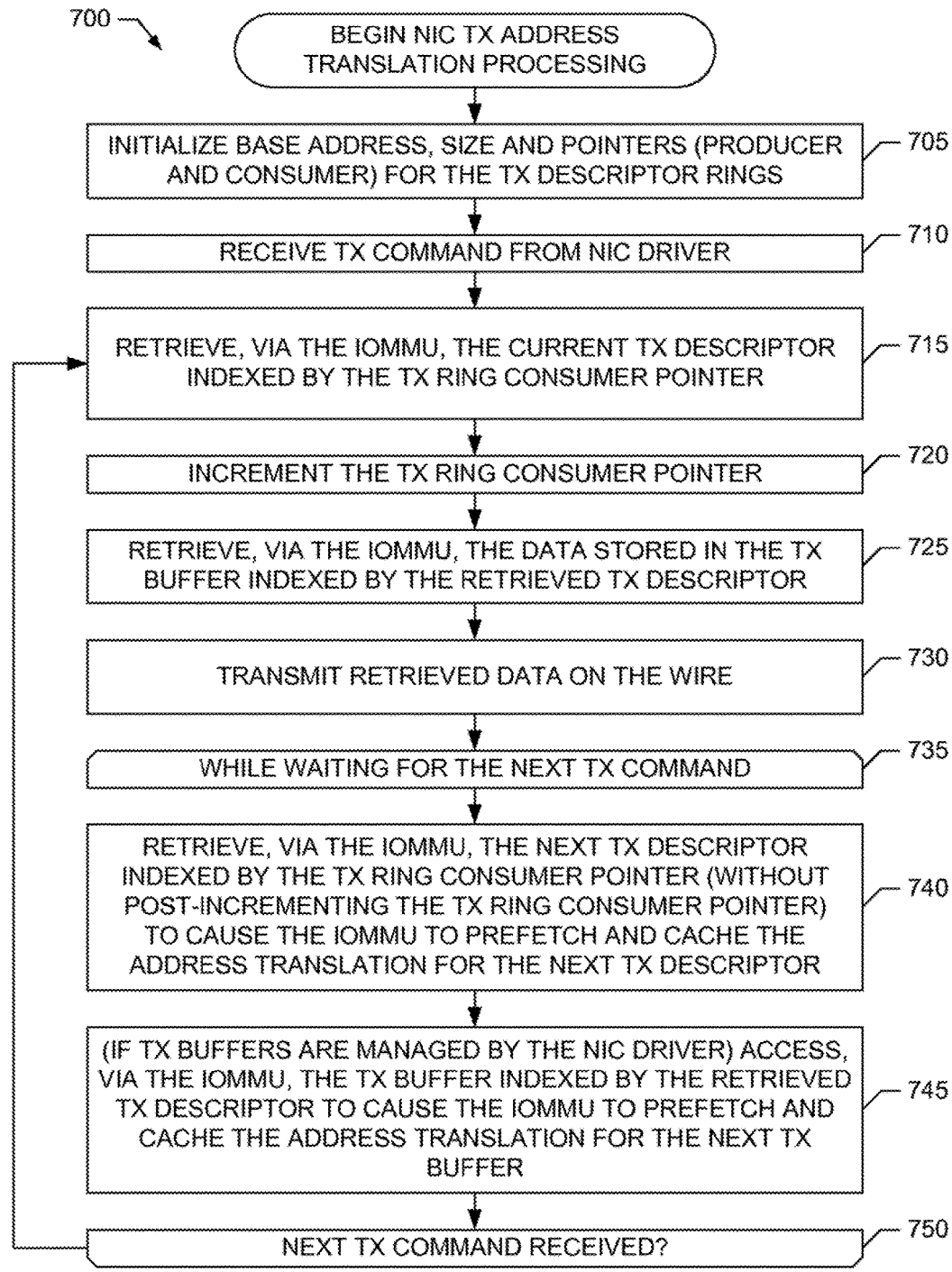
FIG. 7 is a flowchart representative of example machine readable instructions that may be executed to implement address translation processing for the transmit path in the example NIC DMA enhancer of FIG. 2.

Example machine readable instructions 700 that may be executed to implement, in the NIC 125 of FIG. 1, address translation processing for DMA operations associated with transmitting data are illustrated in FIG. 7. The example machine readable instructions 700 correspond to an example implementation by the NIC 125 of the functionality provided by the example machine readable instructions 400 of FIG. 4. With reference to the preceding figures and associated descriptions, the example machine readable instructions 700 of FIG. 7 begin execution at block 705 at which the NIC 125 is initialized by the NIC driver 155 with the base address, size, and the producer and consumer pointers of the transmit descriptor ring 185. At block 710, the NIC 125 receives a transmit command from the NIC driver 155 indicating that there is data ready to be transmitted via the communication medium 140. At block 715, the NIC 125 initiates a DMA read operation to retrieve, via the IOMMU 170, the current transmit descriptor pointed to (or indexed by) the consumer pointer of the transmit descriptor ring 185. As described above, the current transmit descriptor indexes (e.g., by including the guest physical address of) the current transmit buffer 165 storing the data to be transmitted by the NIC 125. At block 720, the NIC 125 post-increments the consumer pointer of the transmit descriptor ring 185 to point to the next transmit descriptor in the transmit descriptor ring 185. As described above, this next transmit descriptor indexes (e.g., by including the guest physical address of) the next transmit buffer 165 to be used to store the next data to be transmitted by the NIC 125 in the future. At block 725, the NIC 125 initiates a DMA read operation to retrieve, via the IOMMU 170, the data stored in the transmit buffer 165 indexed by the transmit descriptor retrieved at block 715. At block 730, the NIC 125 transmits the data retrieved at block 725 over the communication medium 140.

Next, while the NIC 125 is waiting for the next transmit command from the NIC driver 155 (block 535), the processing at blocks 740 and/or 745 is performed. At block 740, the transmit descriptor prefetcher 225 of the NIC 125 causes the IOMMU 170 to prefetch and cache an address translation mapping the guest physical address of the next transmit descriptor pointed to by the consumer pointer of the transmit descriptor ring 185 to the host physical address of this transmit descriptor. As described above, the transmit descriptor prefetcher 225 of the NIC 125 causes the prefetching at block 740 to be performed by, for example, initiating a DMA read operation to read the guest physical address pointed to by the consumer pointer of the transmit descriptor ring 185, which corresponds to the guest physical address of the next transmit descriptor in the transmit descriptor ring 185. As further described above, the DMA read operation performed at block 740 causes the IOMMU 170 to determine (if necessary) and cache the address translation mapping the guest physical address of the next transmit descriptor to its host physical address. However, because the next receive descriptor is not being read to actually retrieve any data for transmission, the consumer pointer of the transmit descriptor ring 185 is not post-incremented at block 740.

In some examples (e.g., such as in the examples described above in which the transmit buffers 165 are allocated to, copied to and/or otherwise managed by the NIC driver 155), at block 745 the transmit buffer prefetcher 230 of the NIC 125 causes the IOMMU 170 to prefetch and cache an address translation mapping the guest physical address of the next transmit buffer 185, which is indexed by the next transmit descriptor retrieved at block 740, to the host physical address of this transmit buffer 165. As described above, the transmit buffer prefetcher 230 of the NIC 125 causes the prefetching at block 745 to be performed by, for example, initiating a DMA read operation to access the guest physical address of the transmit buffer 165 included in the next transmit descriptor, which was retrieved at block 740. As further described above, the DMA operation performed at block 745 causes the IOMMU 170 to determine (if necessary) and cache the address translation mapping the guest physical address of the next transmit buffer 165 to its host physical address. Then, when the next transmit command is received by the NIC 125 (block 750), processing returns to block 715 and the blocks subsequent thereto at which the NIC 125 initiates DMA operations to retrieve the next packet to be transmitted via the communication medium 140. Due to the prefetching performed at block 740 and/or 745, there may be a higher likelihood of achieving cache hits when performing address translations for the DMA operations initiated to retrieve this next data to be transmitted.

Figure 8:
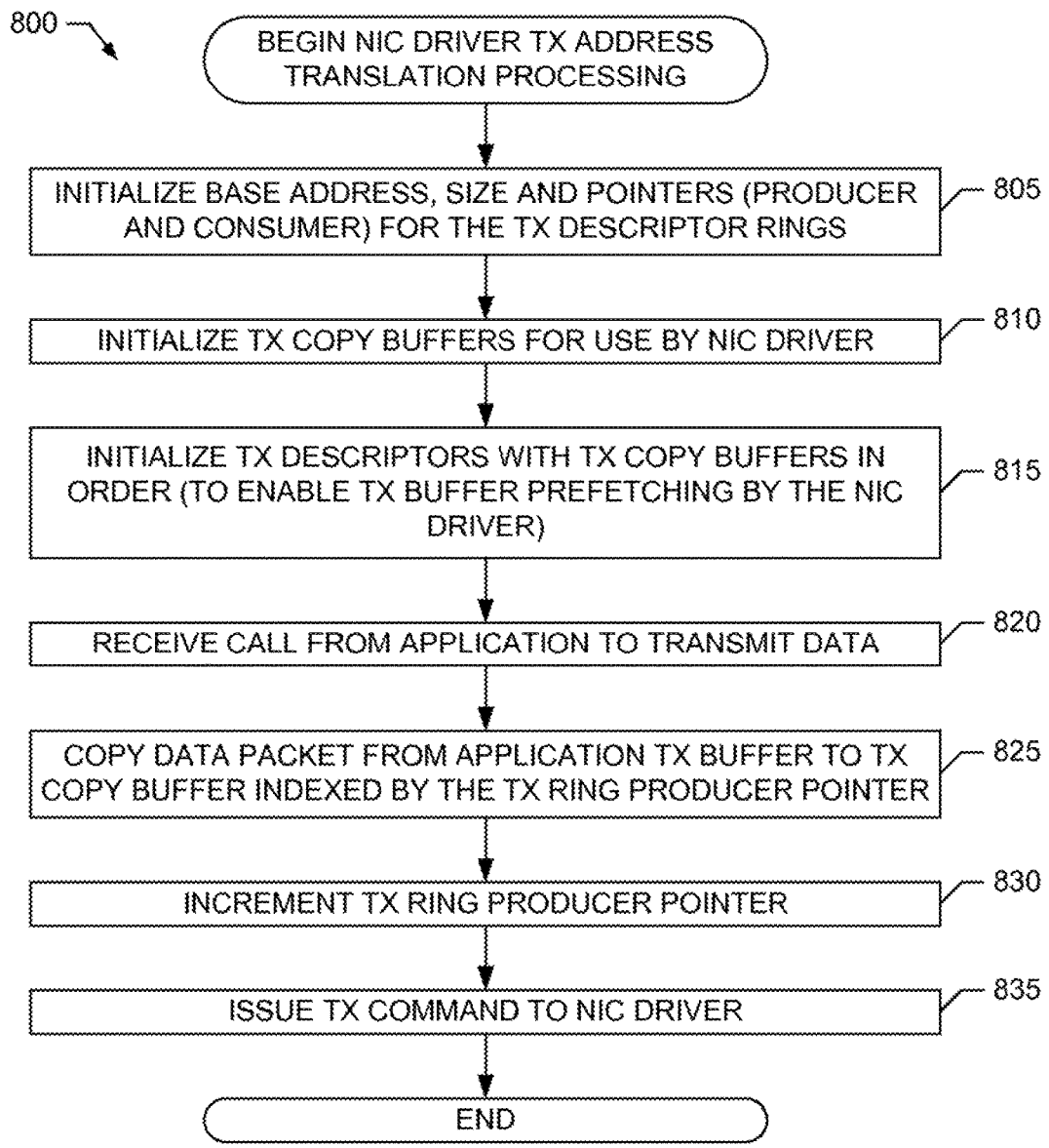
FIG. 8 is a flowchart representative of example machine readable instructions that may be executed to implement address translation processing for the transmit path in the example NIC driver DMA enhancer of FIG. 2.

Example machine readable instructions 800 that may be executed to implement, in the NIC driver 155 of FIG. 1, address translation processing for DMA operations associated with transmitting data are illustrated in FIG. 8. The example machine readable instructions 800 correspond to an example implementation by the NIC driver 155 of the functionality provided by the example machine readable instructions 400 of FIG. 4. With reference to the preceding figures and associated descriptions, the example machine readable instructions 800 of FIG. 8 begin execution at block 805 at which the NIC driver 155 initializes the base address, size, and the producer and consumer pointers of the transmit descriptor ring 185. At block 810, the transmit buffer initializer 240 of the NIC driver 155 initializes, as described above, a subset of the transmit buffers 165 for use by the NIC driver 155 as transmit copy buffers 165. At block 815, the transmit buffer initializer 240 of the NIC driver 155 initializes the transmit descriptors in the transmit descriptor ring 185 to index the transmit copy buffers 165 initialized at block 810. At block 820, the NIC driver 155 receives a call from an application 145 including a pointer to the application's transmit buffer 165, which is storing the data to be transmitted. At block 825, the transmit buffer filler 245 of the NIC driver 155 copies the data for transmission from the application's transmit buffer 165 to the current transmit copy buffer 165 indexed by the transmit descriptor pointed to by the producer pointer of the transmit descriptor ring 185. At block 830, the transmit buffer filler 245 of the NIC driver 155 post-increments the producer pointer to point to the next transmit descriptor in the transmit descriptor ring 185, which indexes the next transmit copy buffer 165 into which the NIC driver 155 will copy the next data to be transmitted. At block 835, the NIC driver 155 issues a transmit command to the NIC 125 indicating there is data that is ready to be transmitted.

Figure 9:
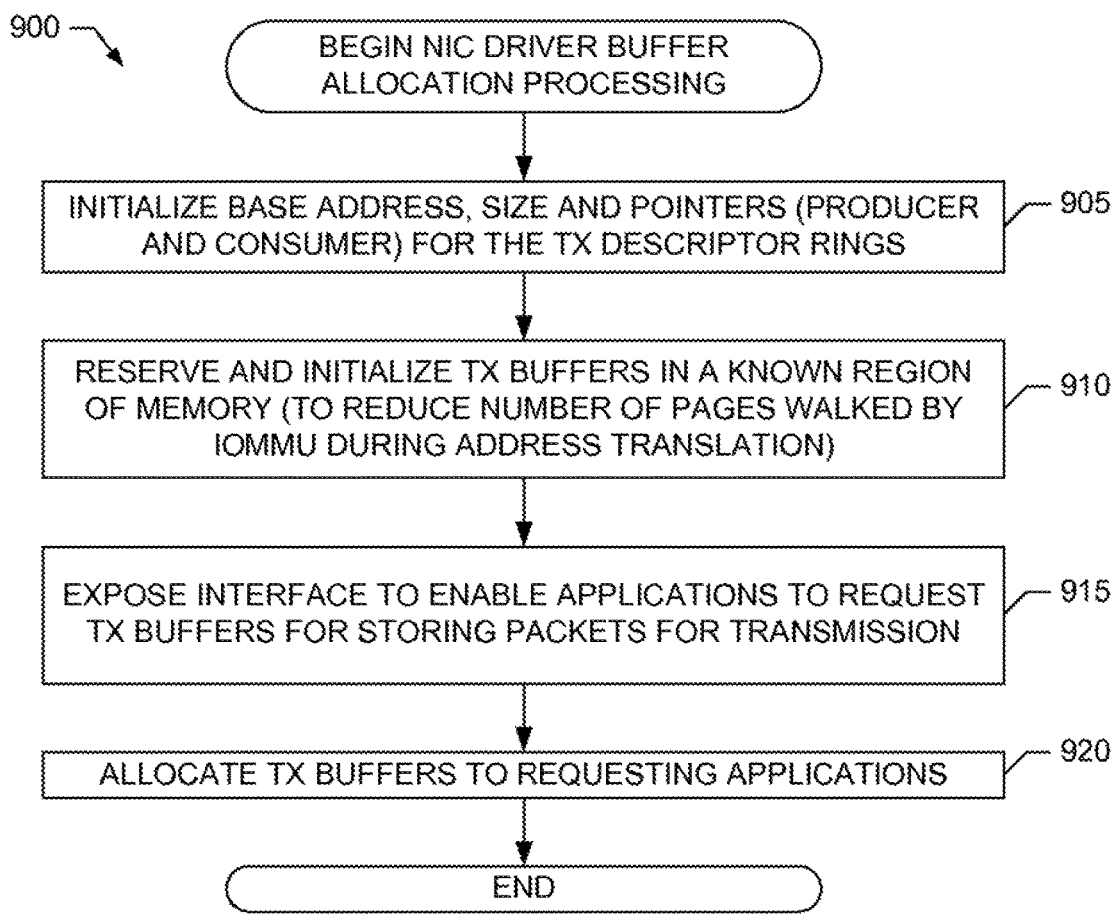
FIG. 9 is a flowchart representative of example machine readable instructions that may be executed to implement transmit buffer allocation processing in the example NIC driver DMA enhancer of FIG. 2.

Example machine readable instructions 900 that may be executed to implement transmit buffer allocation processing in the NIC driver 155 of FIG. 1 are illustrated in FIG. 9. With reference to the preceding figures and associated descriptions, the example machine readable instructions 900 of FIG. 9 begin execution at block 905 at which the NIC driver 155 initializes the base address, size, and the producer and consumer pointers of the transmit descriptor ring 185. At block 910, the transmit buffer initializer 240 of the NIC driver 155 initializes, as described above, some or all of the transmit buffers 165 to be located in one or more contiguous regions of memory 120, and reserves these transmit buffers 165 for allocation by the NIC driver 155. As described above, the transmit buffers 165 initialized at block 910 are located in the memory 120 such that they can be indexed, for example, using fewer than all of the address translation page tables 175 employed by the IOMMU 170. At block 915, the transmit buffer allocator 250 of the NIC driver 155 exposes, as described above, an API via which an application 145 can request to be allocated one or more of the transmit buffers 165 reserved at block 910 for allocation by the NIC driver 155. At block 920, the transmit buffer allocator 250 of the NIC driver 155 allocates the requested number(s) of transmit buffers 165 to those application(s) 145 from which requests are received.

Figure 10:
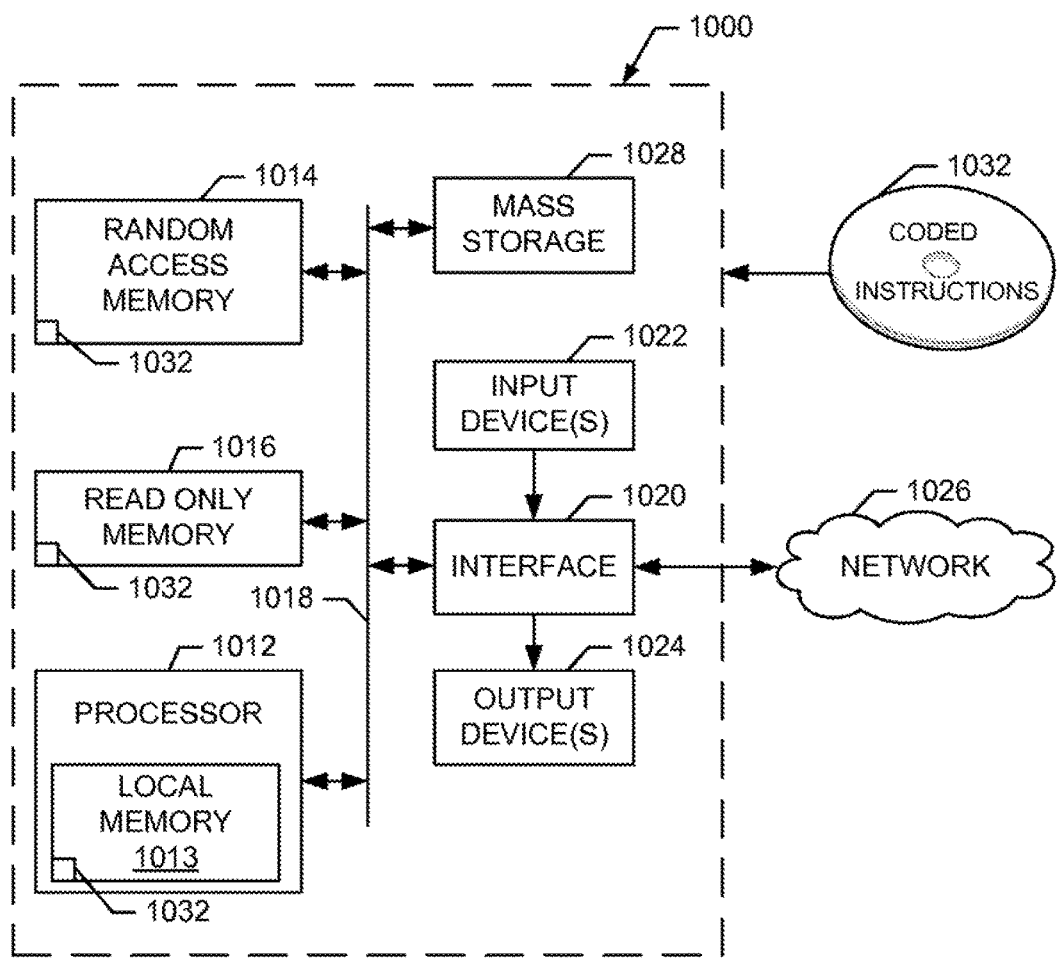
FIG. 10 is a block diagram of an example processing system that may execute the example machine readable instructions of FIGS. 3-8 and/or 9 to implement the example NIC DMA enhancer of FIG. 2, the example NIC driver DMA enhancer of FIG. 2 and/or the example virtual processing environment of FIG. 1.

FIG. 10 is a block diagram of an example processor platform 1000 capable of executing the instructions of FIGS. 3-9 to implement the example virtual processing environment 100, the example host processor 105, the example virtual machine 110, the example hypervisor 112, the example system bus 115, the example memory 120, the example NIC 125, the example external interface bus 130, the example chipset 135, the example communication medium 140, the example application(s) 145, the example protocol stack 150, the example NIC driver 155, the example IOMMU 170, the example NIC DMA enhancer 190, the example NIC driver DMA enhancer 195, the example virtual NIC driver 1105, the example virtual NIC 1110, the example physical NIC driver 1115, the example address translation logic 205, the example IOTLB 210, the example receive descriptor prefetcher 215, the example receive buffer prefetcher 220, the example transmit descriptor prefetcher 225, the example transmit buffer prefetcher 230, the example receive address prefetcher 235, the example transmit buffer initializer 240, the example transmit buffer filler 245 and/or the example transmit buffer allocator 250 of FIGS. 1-2. The processor platform 1000 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

The coded instructions 1032 of FIGS. 3-9 may be stored in the mass storage device 1028, in the volatile memory 1014, in the non-volatile memory 1016, and/or on a removable tangible computer readable storage medium such as a CD or DVD.

As an alternative to implementing the methods and/or apparatus described herein in a system such as the processing system of FIG. 10, the methods and or apparatus described herein may be embedded in a structure such as a processor and/or an ASIC (application specific integrated circuit).

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method of performing direct memory access (DMA) operations to access transmit data by a network interface in response to transmit commands issued by a network interface driver of a virtual machine executing on a host, wherein the transmit commands includes a first command to transmit first data stored in memory at a first memory location referenced by a first descriptor and a second command, issued next in sequence to the first command, to transmit second data stored in memory at a second memory location referenced by a second descriptor, the method comprising:

responsive to the first command, carrying out a first DMA operation that includes retrieving the first data using a first host physical address associated with the first memory location and transmitting the first data;

after the first DMA operation is carried out and before the second command is issued, fetching the second descriptor and performing an address translation to cache a second host physical address associated with the second memory location; and responsive to the second command, carrying out a second DMA operation that includes retrieving the second data using the cached second host physical address associated with the second memory location and transmitting the second data.

2. The method according to claim 1, wherein the second descriptor includes a guest physical address and the address translation includes translating the guest physical address to the second host physical address.

3. The method according to claim 2, wherein fetching the second descriptor includes performing an address translation to cache a third host physical address associated with a third memory location in memory at which the second descriptor is stored.

4. The method according to claim 1, wherein the first and second descriptors are parts of a descriptor ring that has a producer pointer that is incremented by one responsive to a new descriptor being added to the descriptor ring and a consumer pointer that is incremented by one responsive to a DMA operation being performed on data stored at a memory location referenced by a descriptor in the descriptor ring.

5. The method according to claim 4, wherein the consumer pointer is incremented by one responsive to the first DMA operation, as a result of which the consumer pointer points to the memory location at which the second descriptor is stored, and is further incremented by one responsive to the second DMA operation, as a result of which the consumer pointer points to a memory location at which a third descriptor in the descriptor ring is stored.

6. The method according to claim 5, wherein the consumer pointer is not incremented responsive to either the fetching of the second descriptor or the performing of the address translation.

7. The method according to claim 1, wherein the address translation is carried out by an input/output memory management unit and the second host physical address is cached in an input/output translation lookaside buffer.

8. A non-transitory computer readable storage medium comprising instructions executable in a computing system to cause the computing system to perform a method of performing direct memory access (DMA) operations to access transmit data by a network interface in response to transmit commands issued by a network interface driver of a virtual machine executing on a host, wherein the transmit commands includes a first command to transmit first data stored in memory at a first memory location referenced by a first descriptor and a second command, issued next in sequence to the first command, to transmit second data stored in memory at a second memory location referenced by a second descriptor, the method comprising the steps of:

responsive to the first command, carrying out a first DMA operation that includes retrieving the first data using a first host physical address associated with the first memory location and transmitting the first data;

after the first DMA operation is carried out and before the second command is issued, fetching the second descriptor and performing an address translation to cache a second host physical address associated with the second memory location; and responsive to the second command, carrying out a second DMA operation that includes retrieving the second data using the cached second host physical address associated with the second memory location and transmitting the second data.

9. The non-transitory computer readable storage medium according to claim 8, wherein the second descriptor includes a guest physical address and the address translation includes translating the guest physical address to the second host physical address.

10. The non-transitory computer readable storage medium according to claim 9, wherein fetching the second descriptor includes performing an address translation to cache a third host physical address associated with a third memory location in memory at which the second descriptor is stored.

11. The non-transitory computer readable storage medium according to claim 8, wherein the first and second descriptors are parts of a descriptor ring that has a producer pointer that is incremented by one responsive to a new descriptor being added to the descriptor ring and a consumer pointer that is incremented by one responsive to a DMA operation being performed on data stored at a memory location referenced by a descriptor in the descriptor ring.

12. The non-transitory computer readable storage medium according to claim 11, wherein the consumer pointer is incremented by one responsive to the first DMA operation, as a result of which the consumer pointer points to the memory location at which the second descriptor is stored, and is further incremented by one responsive to the second DMA operation, as a result of which the consumer pointer points to a memory location at which a third descriptor in the descriptor ring is stored.

13. The non-transitory computer readable storage medium according to claim 12, wherein the consumer pointer is not incremented responsive to either the fetching of the second descriptor or the performing of the address translation.

14. The non-transitory computer readable storage medium according to claim 8, wherein the address translation is carried out by an input/output memory management unit of the computer system and the second host physical address is cached in an input/output translation lookaside buffer of the computer system.

15. A system comprising:
a memory;
a network interface driver that operates on a virtual machine executing on a host and is configured to issue transmit commands, which includes a first command to transmit first data stored in the memory at a first memory location referenced by a first descriptor and a second command, next in sequence to the first command, to transmit second data stored in the memory at a second memory location referenced by a second descriptor; and
a network interface configured to
carry out a first DMA operation that includes retrieving the first data using a first host physical address associated with the first memory location and transmitting the first data, responsive to the first command,
after the first DMA operation is carried out and before the second command is issued, fetch the second descriptor and perform an address translation to cache a second host physical address associated with the second memory location, and
carry out a second DMA operation that includes retrieving the second data using the cached second host physical address associated with the second memory location and transmitting the second data, responsive to the second command.

16. The system according to claim 15, wherein
the second descriptor includes a guest physical address and the address translation includes translating the guest physical address to the second host physical address.

17. The system according to claim 16, wherein
the network interface performs an address translation to cache a third host physical address associated with a third memory location in the memory at which the second descriptor is stored, to fetch the second descriptor.

18. The system according to claim 15, wherein the first and second descriptors are parts of a descriptor ring that has a producer pointer that the network interface increments by one responsive to a new descriptor being added to the descriptor ring and a consumer pointer that the network interface increments by one responsive to a DMA operation being performed on data stored at a memory location referenced by a descriptor in the descriptor ring.

19. The system according to claim 18, wherein the network interface increments the consumer pointer by one responsive to the first DMA operation, as a result of which the consumer pointer points to the memory location at which the second descriptor is stored, and further increments by one responsive to the second DMA operation, as a result of which the consumer pointer points to a memory location at which a third descriptor in the descriptor ring is stored.

20. The system according to claim 19, wherein the network interface does not increment the consumer pointer responsive to either the fetching of the second descriptor or the performing of the address translation.

* * * * *